United States Patent
Tofte et al.

(10) Patent No.: US 12,033,221 B2
(45) Date of Patent: *Jul. 9, 2024

(54) INSURANCE UNDERWRITING AND RE-UNDERWRITING IMPLEMENTING UNMANNED AERIAL VEHICLES (UAVs)

(71) Applicant: STATE FARM MUTUAL AUTOMOBILE INSURANCE COMPANY, Bloomington, IL (US)

(72) Inventors: Nathan L. Tofte, Downs, IL (US); Timothy W. Ryan, Hudson, IL (US); Nathan W. Baumann, Bloomington, IL (US); Joshua David Lillie, Bloomington, IL (US); Brian N. Harvey, Bloomington, IL (US); Roxane Lyons, Chenoa, IL (US); Rosemarie Geier Grant, Ellsworth, IL (US); Michael Shawn Jacob, Le Roy, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/206,889

(22) Filed: Jun. 7, 2023

(65) Prior Publication Data
US 2023/0325935 A1    Oct. 12, 2023

Related U.S. Application Data

(63) Continuation of application No. 17/723,900, filed on Apr. 19, 2022, now Pat. No. 11,710,191, which is a
(Continued)

(51) Int. Cl.
*G06Q 40/00*  (2023.01)
*B64C 39/02*  (2023.01)
(Continued)

(52) U.S. Cl.
CPC ........... *G06Q 40/08* (2013.01); *B64C 39/024* (2013.01); *B64D 47/08* (2013.01); *G01C 11/02* (2013.01);
(Continued)

(58) Field of Classification Search
CPC ...... G06Q 40/08; G06Q 40/00; B64C 39/024; B64D 47/08; G01C 11/02; G06F 18/22;
(Continued)

(56) References Cited

U.S. PATENT DOCUMENTS 3,170,206 A   2/1965  Triplett
3,767,152 A   10/1973  Killinger
(Continued)

FOREIGN PATENT DOCUMENTS

EP    3239686 A1   11/2017
EP    3578433 B1   8/2020
(Continued)

OTHER PUBLICATIONS

Qualitative and Quantitative Risk Analysis and Safety Assessment of Unmanned Aerial Vehicles Missions Over the Internet; IEEE Access (vol. 7, pp. 53392-53410); Azza Allouch, Anis Koubaa, Mohamed Khalgui, Tarek Abbes; Jan. 1, 2019. (Year: 2019).*
(Continued)

*Primary Examiner* — Tien C Nguyen
(74) *Attorney, Agent, or Firm* — MARSHALL, GERSTEIN & BORUN LLP

(57) ABSTRACT

Unmanned aerial vehicles (UAVs) may facilitate insurance-related tasks. UAVs may actively be dispatched to an area surrounding a property, and collect data related to property. A location for an inspection of a property to be conducted by a UAV may be received, and one or more images depicting a view of the location may be displayed via a user interface. Additionally, a geofence boundary may be determined based
(Continued)

on an area corresponding to a property boundary, where the geofence boundary represents a geospatial boundary in which to limit flight of the UAV. Furthermore, a navigation route may be determined which corresponds to the geofence boundary for inspection of the property by the UAV, the navigation route having waypoints, each waypoint indicating a location for the UAV to obtain drone data. The UAV may be directed around the property using the determined navigation route.

20 Claims, 6 Drawing Sheets

Related U.S. Application Data continuation of application No. 16/838,372, filed on Apr. 2, 2020, now Pat. No. 11,334,953, which is a continuation of application No. 16/509,631, filed on Jul. 12, 2019, now Pat. No. 10,650,469, which is a continuation of application No. 14/858,075, filed on Sep. 18, 2015, now Pat. No. 10,410,289.

(60) Provisional application No. 62/209,963, filed on Aug. 26, 2015, provisional application No. 62/209,755, filed on Aug. 25, 2015, provisional application No. 62/209,627, filed on Aug. 25, 2015, provisional application No. 62/208,201, filed on Aug. 21, 2015, provisional application No. 62/207,421, filed on Aug. 20, 2015, provisional application No. 62/207,127, filed on Aug. 19, 2015, provisional application No. 62/053,519, filed on Sep. 22, 2014.

(51) Int. Cl.
*B64D 47/08* (2006.01)
*G01C 11/02* (2006.01)
*G06F 18/22* (2023.01)
*G06Q 40/08* (2012.01)
*G06T 7/00* (2017.01)
*G06T 7/20* (2017.01)
*G06T 7/246* (2017.01)
*G06T 7/73* (2017.01)
*G06T 11/60* (2006.01)
*G06T 17/05* (2011.01)
*G06V 10/42* (2022.01)
*G06V 20/10* (2022.01)
*G06V 20/40* (2022.01)
*H04N 5/44* (2011.01)
*H04N 7/18* (2006.01)
*B64U 10/00* (2023.01)
*B64U 101/00* (2023.01)
*B64U 101/30* (2023.01)

(52) U.S. Cl.
CPC ............. *G06F 18/22* (2023.01); *G06Q 40/00* (2013.01); *G06T 7/00* (2013.01); *G06T 7/20* (2013.01); *G06T 7/246* (2017.01); *G06T 7/75* (2017.01); *G06T 11/60* (2013.01); *G06T 17/05* (2013.01); *G06V 10/42* (2022.01); *G06V 20/10* (2022.01); *G06V 20/41* (2022.01); *H04N 5/44* (2013.01); *H04N 7/185* (2013.01); *B64U 10/00* (2023.01); *B64U 2101/00* (2023.01); *B64U 2101/30* (2023.01); *G06T 2207/10032* (2013.01); *G06T 2207/30232* (2013.01); *G06T 2207/30236* (2013.01); *G06T 2207/30252* (2013.01); *G06T 2215/16* (2013.01); *G06V 20/44* (2022.01)

(58) Field of Classification Search
CPC .. G06T 7/00; G06T 7/20; G06T 7/246; G06T 7/75; G06T 11/60; G06T 17/05; G06T 2207/10032; G06T 2207/30232; G06T 2207/30236; G06T 2207/30252; G06T 2215/16; G06V 20/10; G06V 20/41; G06V 20/44; H04N 5/44; H04N 7/185; B64U 10/00; B64U 2101/00; B64U 2101/30
USPC ...... 705/4, 39, 2, 5, 37, 38, 40, 50, 310, 64, 705/1.1, 7.28, 311, 26.35, 34, 44; 715/742, 205; 235/492, 378, 379
See application file for complete search history.

(56) References Cited

U.S. PATENT DOCUMENTS

| | | | |
|---|---|---|---|
| 3,883,926 A | 5/1975 | Reynolds | |
| 5,035,558 A | 7/1991 | Prosen | |
| 5,076,079 A | 12/1991 | Monoson et al. | |
| 5,207,171 A | 5/1993 | Westwood, III | |
| 5,686,892 A | 11/1997 | Smith | |
| 5,730,246 A | 3/1998 | Beard | |
| 5,875,867 A | 3/1999 | Beard | |
| 5,913,479 A | 6/1999 | Westwood, III | |
| 5,975,499 A | 11/1999 | Ostrobrod | |
| 6,056,237 A | 5/2000 | Woodland | |
| 6,112,853 A | 9/2000 | Beard | |
| 6,166,729 A * | 12/2000 | Acosta | H04L 69/16 348/E7.063 |
| 6,567,044 B2 | 5/2003 | Carroll | |
| 7,053,823 B2 | 5/2006 | Cervinka et al. | |
| 7,458,238 B2 | 12/2008 | Stolk et al. | |
| 7,480,715 B1 * | 1/2009 | Barker | H04L 63/1416 709/224 |
| 7,493,211 B2 | 2/2009 | Breen | |
| 7,523,910 B2 | 4/2009 | Moran | |
| 7,809,587 B2 * | 10/2010 | Dorai | G06Q 10/10 703/8 |
| 7,889,931 B2 * | 2/2011 | Webb | G01N 21/8851 382/209 |
| 7,912,738 B1 | 3/2011 | Martin | |
| 7,953,615 B2 * | 5/2011 | Aquila | G06Q 40/08 705/2 |
| 8,019,629 B1 | 9/2011 | Medina, III et al. | |
| 8,025,125 B2 | 9/2011 | Vetesnik et al. | |
| 8,095,391 B2 | 1/2012 | Obora et al. | |
| 8,239,220 B2 * | 8/2012 | Kidd | G01C 11/06 705/305 |
| 8,265,963 B1 * | 9/2012 | Hanson | G06Q 30/0283 705/5 |
| 8,280,633 B1 | 10/2012 | Eldering et al. | |
| 8,346,578 B1 * | 1/2013 | Hopkins, III | G06Q 30/02 705/14.66 |
| 8,355,966 B1 | 1/2013 | Vu et al. | |
| 8,374,957 B1 * | 2/2013 | Garcia | G06Q 20/405 705/40 |
| 8,401,878 B2 | 3/2013 | Stender et al. | |
| 8,527,305 B1 * | 9/2013 | Hanson | G06Q 10/20 705/5 |
| 8,537,338 B1 * | 9/2013 | Medasani | G01S 7/4802 382/104 |
| 8,543,486 B2 * | 9/2013 | Donoho | G06Q 40/04 705/37 |
| 8,630,820 B2 * | 1/2014 | Amis | G08B 25/016 702/186 |
| 8,650,106 B1 | 2/2014 | Hopkins, III | |
| 8,700,434 B1 | 4/2014 | DeLong et al. | |
| 8,712,893 B1 | 4/2014 | Brandmaier et al. | |
| 8,756,085 B1 | 6/2014 | Plummer et al. | |
| 8,788,127 B1 | 7/2014 | Waldo et al. | |
| 8,799,034 B1 | 8/2014 | Brandmaier et al. | |
| 8,818,572 B1 | 8/2014 | Tofte et al. | |
| 8,862,288 B2 | 10/2014 | Vavrina et al. | |

(56) References Cited

U.S. PATENT DOCUMENTS

| | | | |
|---|---|---|---|
| 8,872,818 | B2 | 10/2014 | Freeman et al. |
| 8,909,391 | B1 | 12/2014 | Peeters et al. |
| 8,930,044 | B1 | 1/2015 | Peeters et al. |
| 8,948,935 | B1 | 2/2015 | Peeters et al. |
| 8,970,400 | B2 | 3/2015 | Verna et al. |
| 8,983,682 | B1 | 3/2015 | Peeters et al. |
| 9,019,092 | B1 | 4/2015 | Brandmaier et al. |
| 9,020,536 | B1 | 4/2015 | Crossno et al. |
| 9,051,043 | B1 | 6/2015 | Peeters et al. |
| 9,069,869 | B1 | 6/2015 | Quinn et al. |
| 9,082,015 | B2 | 7/2015 | Christopulos et al. |
| 9,129,355 | B1 | 9/2015 | Harvey et al. |
| 9,131,224 | B1 | 9/2015 | Freeman et al. |
| 9,139,310 | B1 | 9/2015 | Wang |
| 9,159,132 | B1 | 10/2015 | Crowsey |
| 9,162,753 | B1 | 10/2015 | Panto et al. |
| 9,254,363 | B2 | 2/2016 | Levien et al. |
| 9,307,383 | B1 | 4/2016 | Patrick |
| 9,311,271 | B2 | 4/2016 | Wright |
| 9,443,207 | B2 | 9/2016 | Przybylko et al. |
| 9,505,494 | B1 | 11/2016 | Marlow et al. |
| 9,536,148 | B2 | 1/2017 | Gross |
| 9,563,201 | B1 | 2/2017 | Tofte et al. |
| 9,609,288 | B1* | 3/2017 | Richman .............. G06F 18/214 |
| 9,612,598 | B2 | 4/2017 | Schultz et al. |
| 9,633,487 | B2 | 4/2017 | Wright |
| 9,646,283 | B2 | 5/2017 | Kantor et al. |
| 9,665,094 | B1 | 5/2017 | Russell |
| 9,691,103 | B1 | 6/2017 | Hopkins, III |
| 9,754,325 | B1 | 9/2017 | Konrardy et al. |
| 9,776,716 | B2 | 10/2017 | Levien et al. |
| 9,792,656 | B1 | 10/2017 | Konrardy et al. |
| 9,824,397 | B1 | 11/2017 | Patel et al. |
| 9,830,748 | B2 | 11/2017 | Rosenbaum |
| 9,846,915 | B2 | 12/2017 | Howe et al. |
| 9,852,487 | B1 | 12/2017 | Farnsworth et al. |
| 9,870,609 | B2 | 1/2018 | Kompalli et al. |
| 9,875,509 | B1 | 1/2018 | Harvey et al. |
| 9,894,327 | B1 | 2/2018 | Jacob |
| 9,928,553 | B1 | 3/2018 | Harvey et al. |
| 9,953,287 | B1 | 4/2018 | McDonald, Jr. et al. |
| 9,972,054 | B1 | 5/2018 | Konrardy et al. |
| 9,978,030 | B2 | 5/2018 | Lim |
| 9,990,782 | B2 | 6/2018 | Rosenbaum |
| 10,102,584 | B1 | 10/2018 | Devereaux et al. |
| 10,102,589 | B1 | 10/2018 | Tofte et al. |
| 10,145,684 | B1 | 12/2018 | Tofte et al. |
| 10,163,162 | B1 | 12/2018 | Devereaux et al. |
| 10,163,164 | B1 | 12/2018 | Tofte et al. |
| 10,192,369 | B2 | 1/2019 | Wright |
| 10,198,879 | B2 | 2/2019 | Wright |
| 10,269,190 | B2 | 4/2019 | Rosenbaum |
| 10,311,302 | B2 | 6/2019 | Kottenstette et al. |
| 10,366,288 | B1 | 7/2019 | Kottenstette et al. |
| 10,373,256 | B1 | 8/2019 | Allen |
| 10,410,289 | B1 | 9/2019 | Tofte et al. |
| 10,467,824 | B2 | 11/2019 | Rosenbaum |
| 10,535,103 | B1 | 1/2020 | Tofte et al. |
| 10,643,072 | B2 | 5/2020 | Kottenstette et al. |
| 10,839,336 | B2 | 11/2020 | Greiner et al. |
| 10,909,628 | B1 | 2/2021 | Tofte et al. |
| 11,151,378 | B2 | 10/2021 | Kottenstette et al. |
| 11,210,552 | B2 | 12/2021 | Kossyk et al. |
| 11,222,426 | B2 | 1/2022 | Richter et al. |
| 11,227,452 | B2 | 1/2022 | Rosenbaum |
| 11,232,150 | B2 | 1/2022 | Vianello et al. |
| 11,367,265 | B2 | 6/2022 | Vianello et al. |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2002/0002475 | A1 | 1/2002 | Freedman et al. |
| 2002/0007225 | A1* | 1/2002 | Costello .............. G06Q 30/0643 |
| | | | 700/106 |
| 2002/0055861 | A1* | 5/2002 | King ...................... G06Q 40/08 |
| | | | 705/4 |
| 2003/0004636 | A1 | 1/2003 | Adachi |
| 2003/0040934 | A1 | 2/2003 | Skidmore et al. |
| 2003/0069002 | A1 | 4/2003 | Hunter et al. |
| 2003/0154111 | A1* | 8/2003 | Dutra .................. G06Q 30/0283 |
| | | | 705/400 |
| 2004/0088198 | A1* | 5/2004 | Childress ................ G06Q 40/02 |
| | | | 705/4 |
| 2004/0243423 | A1* | 12/2004 | Rix ........................ G06Q 10/10 |
| | | | 705/400 |
| 2005/0080649 | A1* | 4/2005 | Alvarez ................. G06Q 40/08 |
| | | | 705/322 |
| 2005/0128074 | A1 | 6/2005 | Culpepper et al. |
| 2006/0058928 | A1 | 3/2006 | Beard et al. |
| 2006/0071783 | A1 | 4/2006 | Culpepper et al. |
| 2006/0167597 | A1 | 7/2006 | Bodin et al. |
| 2006/0249622 | A1 | 11/2006 | Steele |
| 2006/0289233 | A1 | 12/2006 | Flaherty |
| 2008/0091490 | A1* | 4/2008 | Abrahams ............... G06Q 40/08 |
| | | | 705/30 |
| 2008/0114655 | A1 | 5/2008 | Skidmore |
| 2008/0159591 | A1 | 7/2008 | Ruedin |
| 2008/0224854 | A1 | 9/2008 | Furey et al. |
| 2008/0255887 | A1* | 10/2008 | Gruter .................... G06Q 40/08 |
| | | | 705/4 |
| 2009/0002364 | A1* | 1/2009 | Witte, II ............... G06V 20/647 |
| | | | 345/419 |
| 2009/0027253 | A1* | 1/2009 | van Tooren ............ G08G 5/006 |
| | | | 342/29 |
| 2009/0055226 | A1* | 2/2009 | Tritz .................. G06Q 30/0283 |
| | | | 705/400 |
| 2009/0138290 | A1 | 5/2009 | Holden |
| 2009/0157437 | A1 | 6/2009 | Becerra et al. |
| 2009/0219393 | A1 | 9/2009 | Vian et al. |
| 2009/0265193 | A1* | 10/2009 | Collins .............. G06Q 30/0185 |
| | | | 901/46 |
| 2010/0012769 | A1 | 1/2010 | Alber et al. |
| 2010/0027460 | A1 | 2/2010 | Kim et al. |
| 2010/0156816 | A1 | 6/2010 | Relyea, Jr. et al. |
| 2010/0215212 | A1 | 8/2010 | Flakes, Jr. |
| 2010/0235198 | A1 | 9/2010 | Fini et al. |
| 2010/0250022 | A1* | 9/2010 | Hines ................... G05D 1/0094 |
| | | | 701/2 |
| 2010/0302359 | A1* | 12/2010 | Adams .................. H04L 1/0014 |
| | | | 375/240.01 |
| 2011/0006174 | A1 | 1/2011 | Hollinger |
| 2011/0046920 | A1 | 2/2011 | Amis |
| 2011/0130636 | A1 | 6/2011 | Daniel et al. |
| 2011/0137443 | A1* | 6/2011 | Farahani ................. G06F 30/15 |
| | | | 700/98 |
| 2011/0161118 | A1* | 6/2011 | Borden ................... G06Q 50/22 |
| | | | 705/4 |
| 2011/0218825 | A1 | 9/2011 | Hertenstein |
| 2011/0264311 | A1 | 10/2011 | Lee et al. |
| 2012/0016538 | A1 | 1/2012 | Waite et al. |
| 2012/0033821 | A1* | 2/2012 | Ohta ................. G10K 11/17857 |
| | | | 381/71.1 |
| 2012/0071998 | A1* | 3/2012 | Davies ................. G06V 20/653 |
| | | | 700/98 |
| 2012/0140041 | A1* | 6/2012 | Burgunder ............. G01B 11/24 |
| | | | 348/46 |
| 2012/0170797 | A1 | 7/2012 | Pershing et al. |
| 2012/0173290 | A1* | 7/2012 | Collins ................... G06Q 40/08 |
| | | | 705/4 |
| 2012/0209782 | A1 | 8/2012 | Pershing et al. |
| 2012/0210853 | A1* | 8/2012 | Abershitz ................ F41H 11/00 |
| | | | 89/1.11 |
| 2012/0250010 | A1* | 10/2012 | Hannay ................ G01N 21/952 |
| | | | 356/237.1 |
| 2012/0265698 | A1 | 10/2012 | Kidd et al. |
| 2012/0271461 | A1 | 10/2012 | Spata |
| 2012/0299751 | A1 | 11/2012 | Verna et al. |
| 2012/0303336 | A1* | 11/2012 | Becker ...................... B64F 5/00 |
| | | | 703/1 |
| 2013/0033381 | A1 | 2/2013 | Breed |
| 2013/0033851 | A1 | 2/2013 | Wang |
| 2013/0060710 | A1 | 3/2013 | Preuss et al. |
| 2013/0216089 | A1 | 8/2013 | Chen et al. |

(56) References Cited

U.S. PATENT DOCUMENTS

| | | | |
|---|---|---|---|
| 2013/0226624 A1* | 8/2013 | Blessman | H04N 7/181 |
| | | | 705/4 |
| 2013/0233964 A1 | 9/2013 | Woodworth et al. | |
| 2013/0317865 A1 | 11/2013 | Tofte et al. | |
| 2014/0006841 A1 | 1/2014 | Rohleder et al. | |
| 2014/0019166 A1 | 1/2014 | Swanson et al. | |
| 2014/0032034 A1 | 1/2014 | Raptopoulos et al. | |
| 2014/0058763 A1 | 2/2014 | Zizzamia et al. | |
| 2014/0100889 A1 | 4/2014 | Tofte | |
| 2014/0111332 A1 | 4/2014 | Przybylko et al. | |
| 2014/0124621 A1 | 5/2014 | Godzdanker et al. | |
| 2014/0132409 A1 | 5/2014 | Billman et al. | |
| 2014/0163852 A1* | 6/2014 | Borri | G08G 5/0034 |
| | | | 701/120 |
| 2014/0168420 A1 | 6/2014 | Naderhirn et al. | |
| 2014/0244078 A1* | 8/2014 | Downey | G05D 1/0088 |
| | | | 29/832 |
| 2014/0245210 A1* | 8/2014 | Battcher | G01S 13/95 |
| | | | 715/771 |
| 2014/0257862 A1 | 9/2014 | Billman et al. | |
| 2014/0277854 A1 | 9/2014 | Jones et al. | |
| 2014/0288976 A1 | 9/2014 | Thomas et al. | |
| 2014/0316614 A1 | 10/2014 | Newman | |
| 2014/0320651 A1 | 10/2014 | Mcclatchie et al. | |
| 2014/0324405 A1 | 10/2014 | Plummer et al. | |
| 2014/0334684 A1 | 11/2014 | Strimling | |
| 2014/0336928 A1 | 11/2014 | Scott | |
| 2014/0353422 A1 | 12/2014 | Westbrook, Sr. | |
| 2014/0368378 A1 | 12/2014 | Crain et al. | |
| 2015/0016127 A1 | 1/2015 | Brutsche et al. | |
| 2015/0019267 A1 | 1/2015 | Prieto et al. | |
| 2015/0020558 A1 | 1/2015 | Williams | |
| 2015/0025914 A1 | 1/2015 | Lekas | |
| 2015/0046194 A1 | 2/2015 | Waddell et al. | |
| 2015/0105933 A1 | 4/2015 | Martin et al. | |
| 2015/0140954 A1 | 5/2015 | Maier et al. | |
| 2015/0225081 A1 | 8/2015 | Stabler | |
| 2015/0245210 A1 | 8/2015 | Kwon et al. | |
| 2015/0254738 A1 | 9/2015 | Wright, III et al. | |
| 2015/0323932 A1 | 11/2015 | Paduano et al. | |
| 2015/0348204 A1 | 12/2015 | Daues | |
| 2015/0363717 A1 | 12/2015 | Lim | |
| 2016/0063642 A1 | 3/2016 | Luciani et al. | |
| 2016/0071217 A1 | 3/2016 | Edwards et al. | |
| 2016/0071379 A1 | 3/2016 | McKiel, Jr. | |
| 2016/0088286 A1 | 3/2016 | Forsythe et al. | |
| 2016/0111006 A1 | 4/2016 | Srivastava et al. | |
| 2016/0189303 A1* | 6/2016 | Fuchs | G06Q 40/08 |
| | | | 705/4 |
| 2016/0203694 A1 | 7/2016 | Hogasten et al. | |
| 2016/0216711 A1 | 7/2016 | Srivastava et al. | |
| 2016/0217694 A1 | 7/2016 | Batla et al. | |
| 2016/0257423 A1 | 9/2016 | Martin | |
| 2017/0083979 A1 | 3/2017 | Winn et al. | |
| 2017/0200259 A1 | 7/2017 | Yang et al. | |
| 2017/0210451 A1 | 7/2017 | Oh | |
| 2017/0352100 A1 | 12/2017 | Shreve et al. | |
| 2018/0279105 A1 | 9/2018 | Huber et al. | |
| 2021/0192629 A1 | 6/2021 | Tofte et al. | |
| 2021/0256614 A1 | 8/2021 | Tofte et al. | |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |
| WO | WO-2015/158265 A1 | 10/2015 |

OTHER PUBLICATIONS

Information Extraction From Remote Sensing Images for Flood Monitoring and Damage Evaluation; Proceedings of the IEEE (vol. 100, Issue: 10, pp. 2946-2970); Sebastiano B. Serpico, Silvana Dellepiane, Giorgio Boni, Gabriele Moser, Elena Angiati, Roberto Rudari; Aug. 2, 2012. (Year: 2012).*

"How do Body Shop Estimates Affect Car Insurance Claims?" CarInsuranceQuotes.com (Aug. 19, 2013).

Costonis, Michael A. Better Insurer Service Can Reduce Consumer Tolerance Schemes. Journal of Insurance Fraud in America, Fall 2011 (Year 2011).

Costonis, Michael, "Better Insurer Service Can Reduce Consumer Tolerance Schemes," Journal of Insurance Fraud in America (Fall 2011).

Frey, Thomas, "192 Future Uses for Flying Drones," Business Trends. (Sep. 2, 2014).

Frey, Thomas. "192 Future Uses for Flying Drones", Business Trends, Sep. 2, 2014, p. 14 (111. Insurance Adjuster Drones, https://futuristspeaker.com/business-trends/192-future-uses-for-flying-drones/ (Year 2014).

How do Body Shop Estimates Affect Car Insurance Claims? Car Insurance Quotes.com, Aug. 19, 2013 (2 pp.). Year 2013).

Kim et al., On the scheduling of systems of UAVs and fuel service stations for long-term mission fulfillment, J. Intell. Robot Syst., 70:347-59 (2013).

Mulgaonkar, Automated recharging for persistence missions with multiple micro aerial vehicles, A Thesis in Robotics, Presented to the faculties of the University of Pennsylvania in partial fulfillment of the requirements for the Degree of Master of Science in Engineering (2012).

Samadzadegan et al., Earthquake destruction assessment of urban roads network using satellite imagery and fuzzy inference systems, The International Archives of Photogrammetry, Remote Sensing and Spatial Information Sciences, vol. xxxvii, p. B8, pp. 1-6, Beijing, China (2008).

Song et al., Persistent UAV service: An improved scheduling formulation and prototypes of system components, J. Intell. Robot. Syst., 74:221-32 (2014).

Sorcher, Sara, "What Drones Can Do For You," National Journal, Washington, Apr. 11, 2013, pp. 1-4.

U.S. Appl. No. 14/510,307, filed Oct. 9, 2014.
U.S. Appl. No. 14/510,492, filed Oct. 9, 2014.
U.S. Appl. No. 14/510,502, filed Oct. 9, 2014.
U.S. Appl. No. 14/510,536, filed Oct. 9, 2014.
U.S. Appl. No. 14/808,502, filed Jul. 24, 2015.
U.S. Appl. No. 14/824,859, filed Aug. 12, 2015.
U.S. Appl. No. 14/858,034, filed Sep. 18, 2015.
U.S. Appl. No. 14/858,034, Final Office Action, dated Apr. 28, 2020.
U.S. Appl. No. 14/858,034, Final Office Action, dated Feb. 24, 2021.
U.S. Appl. No. 14/858,034, Final Office Action, dated Jul. 26, 2018.
U.S. Appl. No. 14/858,034, Final Office Action, dated May 30, 2019.
U.S. Appl. No. 14/858,034, Nonfinal Office Action, dated Apr. 3, 2018.
U.S. Appl. No. 14/858,034, Nonfinal Office Action, dated Dec. 14, 2018.
U.S. Appl. No. 14/858,034, Nonfinal Office Action, dated Jan. 10, 2020.
U.S. Appl. No. 14/858,034, Nonfinal Office Action, dated Sep. 17, 2020.
U.S. Appl. No. 14/858,038, filed Sep. 18, 2015.
U.S. Appl. No. 14/858,038, Nonfinal Office Action, dated Mar. 29, 2018.
U.S. Appl. No. 14/858,052, filed Sep. 18, 2015.
U.S. Appl. No. 14/858,052, Final Office Action, dated Nov. 14, 2018.
U.S. Appl. No. 14/858,052, Nonfinal Office Action, dated Jun. 15, 2018.
U.S. Appl. No. 14/858,052, Nonfinal Office Action, dated Jun. 25, 2019.
U.S. Appl. No. 14/858,058, filed Sep. 18, 2015.
U.S. Appl. No. 14/858,058, Final Office Action, dated Apr. 24, 2020.

(56) References Cited

OTHER PUBLICATIONS

U.S. Appl. No. 14/858,058, Final Office Action, dated Mar. 10, 2021.
U.S. Appl. No. 14/858,058, Final Office Action, dated May 30, 2019.
U.S. Appl. No. 14/858,058, Nonfinal Office Action, dated Jan. 11, 2019.
U.S. Appl. No. 14/858,058, Nonfinal Office Action, dated Nov. 1, 2019.
U.S. Appl. No. 14/858,058, Nonfinal Office Action, dated Sep. 17, 2020.
U.S. Appl. No. 14/858,073, filed Sep. 18, 2015.
U.S. Appl. No. 14/858,073, Nonfinal Office Action, dated Apr. 20, 2018.
U.S. Appl. No. 14/858,075, filed Sep. 18, 2015.
U.S. Appl. No. 14/858,075, Nonfinal Office Action, dated Jan. 25, 2019.
U.S. Appl. No. 14/858,076, filed Sep. 18, 2015.
U.S. Appl. No. 14/858,076, Final Office Action, dated Apr. 20, 2018.
U.S. Appl. No. 14/858,076, Nonfinal Office Action, dated Dec. 28, 2017.
U.S. Appl. No. 14/858,699, filed Sep. 18, 2015.
U.S. Appl. No. 14/858,699, Nonfinal Office Action, dated Dec. 31, 2018.
U.S. Appl. No. 16/045,851, Nonfinal Office Action, dated Sep. 4, 2018.
U.S. Appl. No. 16/170,197, Tofte et al., filed Oct. 25, 2018.
U.S. Appl. No. 16/509,631, Tofte et al., filed Sep. 18, 2015.
U.S. Appl. No. 16/838,372, Final Office Action, dated Nov. 22, 2021.
U.S. Appl. No. 16/838,372, Nonfinal Office Action, dated May 27, 2021.
U.S. Appl. No. 16/838,417, Nonfinal Office Action, dated Oct. 6, 2021.
U.S. Appl. No. 16/838,485, filed Apr. 2, 2020, Tofte et al., "Disaster Damage Analysis and Loss Mitigation Implementing Unmanned Aerial Vehicles (UAVs)".
U.S. Appl. No. 16/838,485, Nonfinal Office Action, dated Feb. 3, 2022.
Uragun, Energy efficiency for unmanned aerial vehicles, 2011 10th International Conference on Machine Learning and Applications (2011).
Yamazaki et al., Applications of remote sensing and GIS for damage assessment, Earthquake Disaster Mitigation Research Center, NIED, Hyogo, Japan Institute of Industrial Science, University of Tokyo, Tokyo, Japan, pp. 1-12 (2001).
U.S. Appl. No. 16/838,485, Final Office Action, dated Jun. 24, 2022.
U.S. Appl. No. 16/838,417, Notice of Allowance, dated Mar. 8, 2022.
U.S. Appl. No. 16/838,485, Nonfinal Office Action, dated Oct. 27, 2022.
U.S. Appl. No. 17/977,999 Nonfinal Office Action, dated Feb. 9, 2023.

\* cited by examiner

INSURANCE UNDERWRITING AND RE-UNDERWRITING IMPLEMENTING UNMANNED AERIAL VEHICLES (UAVs)

CROSS-REFERENCE TO RELATED APPLICATIONS

This application is a continuation of and claims priority to U.S. application Ser. No. 17/723,900 filed on Apr. 19, 2022, entitled "Insurance Underwriting and Re-Underwriting Implementing Unmanned Aerial Vehicles (UAVs)," which is a continuation of and claims priority to U.S. application Ser. No. 16/838,372 filed on Apr. 2, 2020, entitled "Insurance Underwriting and Re-Underwriting Implementing Unmanned Aerial Vehicles (UAVs)," which is a continuation of and claims priority to U.S. application Ser. No. 16/509,631 filed on Jul. 12, 2019, entitled "Insurance Underwriting and Re-Underwriting Implementing Unmanned Aerial Vehicles (UAVs)," which is a continuation of and claims priority to U.S. application Ser. No. 14/858,075 filed on Sep. 18, 2015, entitled "Insurance Underwriting and Re-Underwriting Implementing Unmanned Aerial Vehicles (UAVs)," which claims the benefit of (1) U.S. Provisional Patent Application No. 62/053,519, entitled "Method of Implementing Unmanned Aerial Vehicles (UAVs)," filed Sep. 22, 2014, (2) U.S. Provisional Patent Application No. 62/209,963, entitled "Disaster Damage Analysis and Loss Mitigation Implementing Unmanned Aerial Vehicles (UAVs)," filed Aug. 26, 2015, (3) U.S. Provisional Patent Application No. 62/207,421 entitled "Insurance Underwriting and Re-Underwriting Implementing Unmanned Aerial Vehicles (UAVs)," filed Aug. 20, 2015, (4) U.S. Provisional Patent Application No. 62/207,127 entitled "Accident Reconstruction Implementing Unmanned Aerial Vehicles (UAVs)," filed Aug. 19, 2015, (5) U.S. Provisional Patent Application No. 62/209,755 entitled "Systems and Methods of Utilizing Unmanned Aerial Vehicles to Detect Insurance Claim Buildup," filed Aug. 25, 2015, (6) U.S. Provisional Patent Application No. 62/209,627 entitled "Systems and Methods for Using Data Collected from Unmanned Aerial Vehicles to Pre-Generate Claims for Insured Approval," filed Aug. 25, 2015, and (7) U.S. Provisional Patent Application No. 62/208,201 entitled "Loss Mitigation Implementing Unmanned Aerial Vehicles (UAVs)," filed Aug. 21, 2015, the disclosure of each of which is hereby expressly incorporated by reference herein in its entirety.

FIELD OF THE DISCLOSURE

The present embodiments relate generally to applications of unmanned aerial vehicles (UAVs). More specifically, the present embodiments relate to using data collected by one or more UAVs as part of an insurance underwriting process.

BACKGROUND

Conventionally, performing insurance-related actions such as insurance policy adjustments, insurance quote calculations, and/or underwriting involve an arduous and time-consuming manual process that requires a large component of human intervention.

The present embodiments may overcome these and/or other deficiencies.

BRIEF SUMMARY

Methods, systems, apparatus, and non-transitory computer-readable media are described that leverage the use of one or more unmanned aerial vehicles (UAVs, or "drones") to facilitate one or more insurance-related tasks. In various embodiments, one or more UAVs may actively survey an insured or potentially insured asset (also referred to herein as "the asset"), such as a home. Upon arrival at an area surrounding the insured or potentially insured asset, the one or more UAVs may collect drone data for the asset, such as images of the asset and/or images of objects in close proximity to the asset, soil samples for soil surrounding the asset, soil and wood samples for trees surrounding the asset, thermal signatures for the asset including temperature data, video, chemical data, weather conditions, audio, etc.

The one or more UAVs may transmit the drone data to a remote server, which may be associated with an insurance provider and/or utilized by an insurance provider, and may analyze the drone data to perform insurance underwriting and/or re-underwriting for the insured asset. Moreover, the drone data may also be analyzed to mitigate risk to the insurance provider. For example, the external computing device may increase insurance premiums for assets which have declined in condition since the initial underwriting. In another example, the owner of the asset may be contacted to discuss a policy adjustment and/or to alert the owner of dangerous conditions discovered by the UAVs and/or the external computing device. In yet another example, the policyholder may have to comply with additional requirements to maintain the policy.

In one aspect, a computer-implemented method of directing an unmanned aerial vehicle for inspecting a property may be provided. The method may include (1) receiving (via one or more processors, and/or wired or wireless communication and/or data transmission) a location for an inspection of a property to be conducted by an unmanned aerial vehicle (UAV); (2) displaying (via a user interface) one or more images depicting a view of the location; (3) determining (via the one or more processors) a geofence boundary based on an area corresponding to a property boundary, wherein the geofence boundary represents a geospatial boundary in which to limit flight of the UAV; (4) determining (via the one or more processors) a navigation route corresponding to the geofence boundary for inspection of the property by the UAV, the navigation route having waypoints, each waypoint indicating a location for the UAV to obtain drone data; and/or (5) directing (via the one or more processors) the UAV around the property using the determined navigation route. The method may include additional, fewer, or alternative actions, including those discussed elsewhere herein.

In another aspect, a system of directing an unmanned aerial vehicle for inspecting a property may be provided. The system may include one or more processors, a communication network, and/or a non-transitory, tangible computer-readable memory coupled to the one or more processors and the communication network and storing machine readable instructions, that when executed by the one or more processors, may cause the system to perform various tasks. For example, the instructions may cause the system to: (1) receive, via the communication network, a location for an inspection of a property to be conducted by an unmanned aerial vehicle (UAV); (2) display, via a user interface, one or more images depicting a view of the location; (3) determine a geofence boundary based on an area corresponding to a property boundary, wherein the geofence boundary represents a geospatial boundary in which to limit flight of the UAV; (4) determine a navigation route corresponding to the geofence boundary for inspection of the property by the UAV, the navigation route having waypoints, each waypoint indicating a location for the UAV to obtain drone data; and/or (5) direct the UAV around the property using the determined navigation route. The system may include additional, fewer, or alternate components and/or functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

I. System Overview

Figure 1:
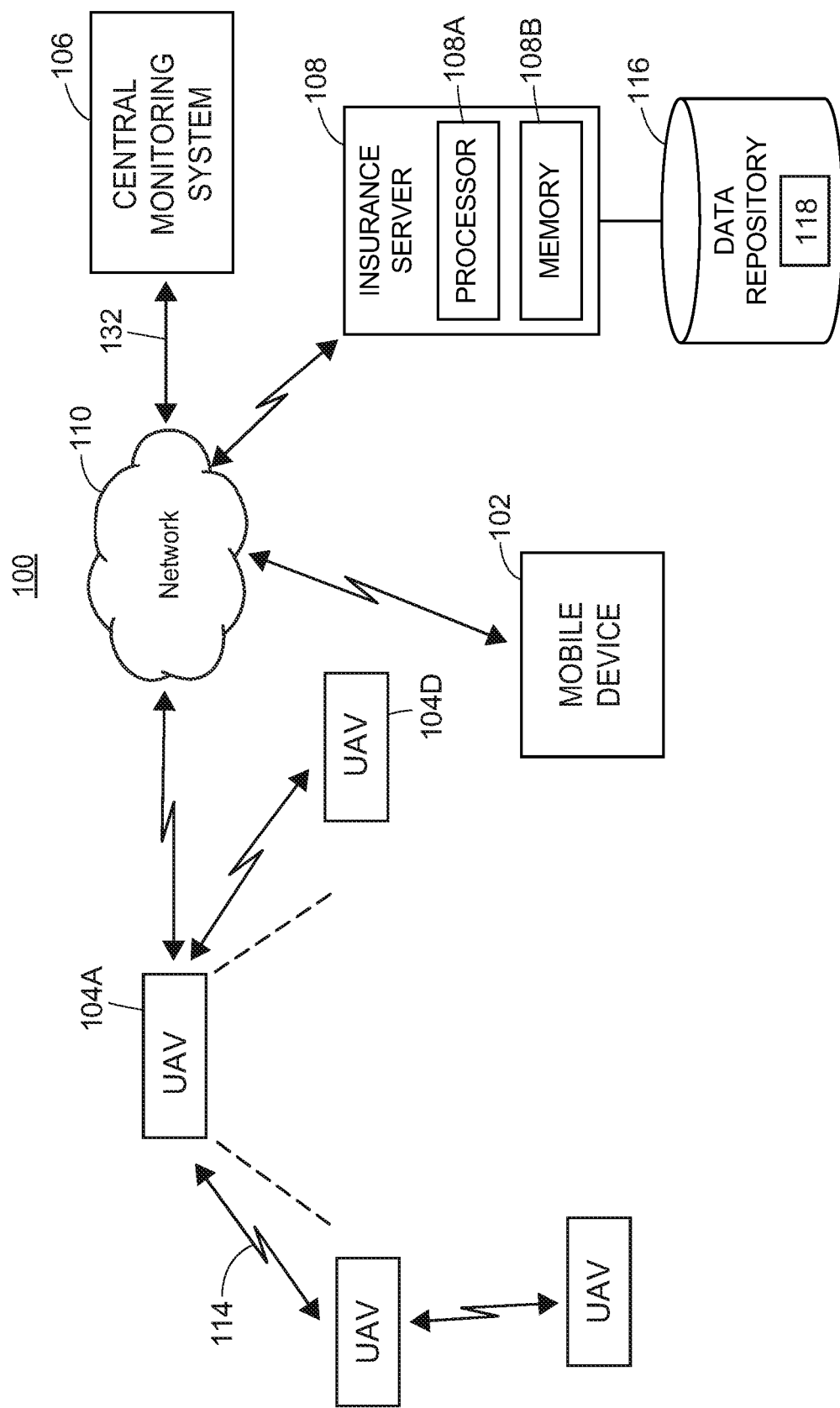
FIG. 1 illustrates an exemplary block diagram of a UAV drone data collection system 100 in accordance with an exemplary aspect of the present disclosure.

FIG. 1 illustrates an exemplary block diagram of a UAV drone data collection system 100. UAV drone data collection system 100 may include N number of UAVs 102.1-102.N, a central monitoring system 150, any suitable number M number of external computing devices 160.1-160.M, a communication network, an insured or potentially insured asset 180, such as an insured property, home, vehicle, or other item, and one or more mobile computing devices 190. The UAV drone data collection system 100 may include additional, fewer, or alternate components, including those discussed elsewhere herein.

In various aspects, any suitable number of UAVs 102.1-102.N may communicate with one another and/or with communication network 170. One or more of UAVs 102.1-102.N may receive commands from other UAVs 102 and/or via communication network 170, process these commands, and execute one or more actions based upon these received commands. One or more of UAVs 102.1-102.N may also transmit data to other UAVs 102.1-102.N and/or to communication network 170.

As is further discussed below, by nature of the connectivity of central monitoring system 150 and external computing devices 160.1-160.M to communication network 170, UAVs 102.1-102.N, central monitoring system 150, external computing devices 160.1-160.M, and/or mobile computing device 190 may communicate with one another. For example, UAV 102.1 may communicate with communication network 170 via wireless link 120, while central monitoring system 150 and external computing devices 160.1-160.M may communicate with communication network 170 via wired links 132. To provide another example, mobile computing device 190 may communicate with communication network 170 via wireless link 191 to send data to and receive data from other devices, such as UAVs 102.1-102.N, central monitoring system 150, and/or external computing devices 160.1-160.M, for example, directly and/or via communication network 170. To provide yet another example, one or more vehicles may communicate with communication network 170 via wireless link 192 to send telematics data to other devices, such as UAVs 102.1-102.N, central monitoring system 150, and/or external computing devices 160.1-160.M, for example, directly and/or via communication network 170.

Communications between UAVs 102.1-102.N, central monitoring system 150, external computing devices 160.1-160.M, and/or mobile computing device 190 may occur with or without communications via communication network 170, in some aspects. For example, UAVs 102.1-102.N may communicate with one another directly via wireless links 122.1-122.N, as shown in FIG. 1.

In various aspects, communications between one or more of UAVs 102.1-102.N, central monitoring system 150, one or more of external computing devices 160.1-160.M, and/or mobile computing device 190 may occur in accordance with any suitable number and/or type of communication protocols, which may be wireless communication protocols, wired communication protocols, or any combination thereof. Furthermore, in various aspects, UAVs 102.1-102.N, central monitoring system 150, external computing devices 160.1-160.M, and/or mobile computing device 190 may communicate with one another and/or with communication network 170 using the same or different types of communication protocols.

For example, one or more of UAVs 102.1-102.N may communicate with one another using a short-range wireless communication protocol, such as Wi-Fi protocol, but communicate with communication network 170, and hence with central monitoring system 150 and/or external computing devices 160.1-160.M, via a cellular protocol. To provide another example, central monitoring system 150 and/or external computing devices 160.1-160.M may communicate with communication network 170, and hence with one another, via an Ethernet protocol.

In some aspects, one or more of UAVs 102.1-102.N may communicate with one another to perform tasks as an intelligent group, thereby acting as and communicating with one another as a drone swarm. In other aspects, one or more of UAVs 102.1-102.N may be controlled individually by other UAVs 102.1-102.N, by central monitoring system 150, by one or more external computing devices 160.1-160.M, and/or mobile computing device 190. Individual control of one or more of UAVs 102.1-102.N may be implemented, for example, via a unique UAV address, a unique frequency channel, a unique code (e.g., a pseudo noise code (PN code) or a pseudo random noise code (PRN code), etc.

As will further discussed below, one or more UAVs 102.1-102.N may execute any suitable action based upon a particular application and/or command that is transmitted to one or more UAVs 102.1-102.N, and/or execute any suitable action autonomously or semi-autonomously. For example, one or more UAVs 102.1-102.N may take aerial pictures or collect sensory data associated with the insured or potentially insured asset 180, navigate to an area surrounding the insured or potentially insured asset to perform various actions, collect images, video, audio, soil and/or wood samples of soil and/or trees surrounding the insured or potentially insured asset, etc.

In various aspects, one or more UAVs 102.1-102.N may be implemented as any suitable type of UAV. For example, one or more UAVs 102.1-102.N may be equipped with any suitable number of propellers, wings, and/or engines to facilitate sustained flight, maneuvering, and/or the execution of various tasks as further discussed herein. For example, one or more UAVs 102.1-102.N may be implemented as quadracopters, flying wings, etc., and may utilize any suitable type of navigation and/or maneuvering control, such as collision-avoidance systems, detect-and-avoid systems, etc.

Communication network 170 may include any appropriate combination of wired and/or wireless communication networks. For example, communication network 170 may include any combination of satellites, a local area network (LAN), a metropolitan area network (MAN), a wide area network (WAN), public switched telephone networks (PSTN), etc., and may facilitate a connection to the Internet for one or more devices communicatively coupled thereto. To provide further examples, communication network 170 may include wired telephone and/or cable hardware, satellite, cellular phone communication networks, etc.

Communication network 170 is shown in FIG. 1 as a single network for purposes of brevity, but may represent more than one type of network and/or an aggregation of several networks. For example, one or more of UAVs 102.1-102.N may communicate with satellites via communication network 170 to supplement lost communications (not shown) and/or communicate with central monitoring system 150 via a cellular network system.

Central monitoring system 150 may be implemented as any suitable device configured to communicate with, command, and/or control one or more UAVs 102.1-102.N. Furthermore, central monitoring system 150 may be implemented as any suitable device configured to receive data from one or more UAV's 102.1-102.N, and to share this data or otherwise make this data available to one or more external computing devices 160.1-160.M.

In some aspects, central monitoring system 150 may be configured to communicate with, command, and/or control one or more UAVs 102.1-102.N individually or as part of a UAV swarm protocol. For example, UAVs 102.1-102.N may include a hierarchy of UAVs in which some of UAVs 102.1-102.N may act as "mothership" UAVs and exert control over other UAVs. Aspects include central monitoring system 150 communicating with, commanding, and/or controlling one or more of UAVs 102.1-102.N via any suitable combination of direct control and/or swarm control techniques.

For example, central monitoring system 150 may be implemented as one or more computers, laptops, mobile devices such as a smartphones, tablet computers, netbooks, notebooks, phablets, wearable electronic devices, smart glasses, etc. In one aspect, central monitoring system 150 may be implemented as one or more specialized components configured to monitor and/or control one or more UAVs 102.1-102.N. For example, central monitoring system 150 may be implemented as a computerized system configured to dispatch one or more UAVs 102.1-102.N, to command one or more UAVs 102.1-102.N to perform various data collection tasks, to navigate one or more UAVs 102.1-102.N to a specific geographic location for repairs, recharging and/or refueling, etc.

In some embodiments, central monitoring system 150 may function automatically or semi-automatically with no user intervention or minimal user intervention, respectively. For example, central monitoring system 150 may be implemented with one or more computing devices that are programmed to receive instructions from one or more external computing devices 160.1-160.M, and to command, control, and/or communicate with one or more UAVs 102.1-102.N based upon these instructions.

In other embodiments, central monitoring system 150 may be staffed with personnel trained to command, control, and/or communicate with one or more UAVs 102.1-102.N based upon a particular scenario or application. For example, a homeowner may request (e.g., via data sent via a mobile computing device application running on mobile computing device 190) an insurance quote for homeowners' insurance for her home. Trained personnel may utilize one or more computing devices implemented by central monitoring system 150 to dispatch one or more UAVs 102.1-102.N to an area surrounding her home to collect data, receive data from one or more UAVs 102.1-102.N, make this data available for insurance-related purposes, etc.

One or more computing devices 160.1-160.M may be implemented as any suitable number and/or type of computing devices configured to facilitate insurance-related tasks using data collected from one or more UAVs 102.1-102.N. For example, one or more computing devices 160.1-160.M may be part of an insurance provider server(s), and as such may access insurance provider databases, algorithms, applications, remote servers, remote processors, etc., as needed to perform insurance-related functions using data collected from one or more UAVs 102.1-102.N. To provide another example, one or more computing devices 160.1-160.M may access weather data, access various private and/or municipal surveillance systems access various security monitoring systems, etc.

In various aspects, one or more UAVs 102.1-102.N, central monitoring system 150, one or more computing devices 160.1-160.M, and/or mobile computing device 190 may share one or more functions such that either of one or more UAVs 102.1-102.N, central monitoring system 150, one or more UAVs 102.1-102.N, and/or mobile computing device 190 may perform any portion (or all) of the functions otherwise performed by the other components. Furthermore, functions may be performed by one or more UAVs 102.1-102.N, central monitoring system 150, one or more computing devices 160.1-160.M, and/or mobile computing device 190 working in concert with one another.

For example, as will be further discussed herein, one or more UAVs 102.1-102.N may analyze collected drone data locally or transmit the drone data to central monitoring system 150 and/or one or more computing devices 160.1-160.M for further analysis, thereby offloading these tasks.

To provide additional examples, in some aspects, central monitoring system 150 and/or one or more computing devices 160.1-160.M may perform the same functions as one another in some aspects, while performing separate, dedicated functions in other aspects. That is, the command, control, and communication functions performed by central monitoring system 150 may be alternatively or additionally performed by one or more computing devices 160.1-160.M. Furthermore, the insurance-related functions performed by one or more computing devices 160.1-160.M may be alternatively or additionally performed by central monitoring system 150.

To provide yet another example, one or more of UAVs 102.1-102.N may function as a central monitoring system, performing command, control, and communication functions over other UAVs 102.1-102.N. These aspects may be particularly useful when one or more of UAVs 102.1-102.N is configured to navigate and communicate with one another in accordance with a swarm protocol.

II. Exemplary UAV or Drone

Figure 2:
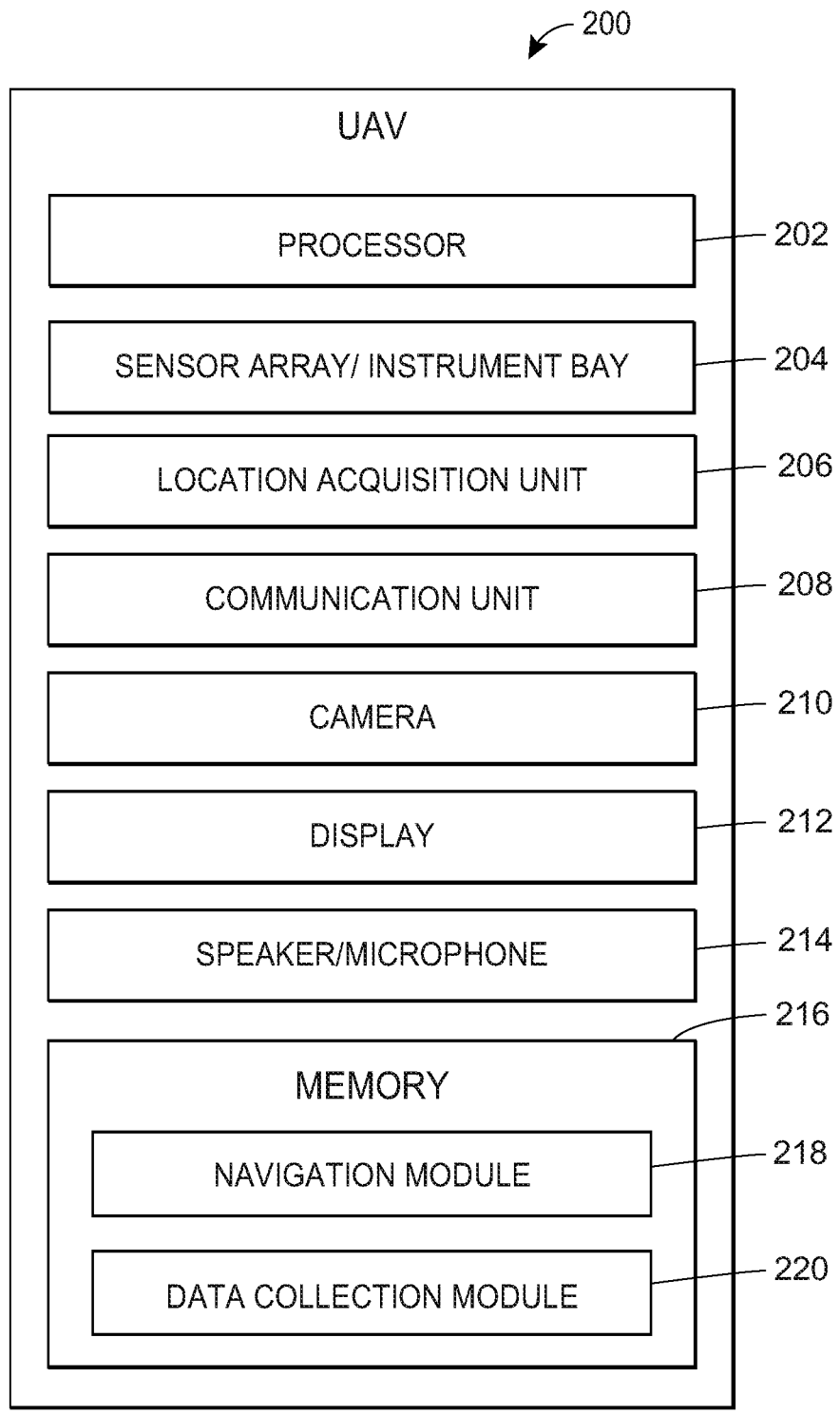
FIG. 2 illustrates an exemplary block diagram of a UAV 200 in accordance with an exemplary aspect of the present disclosure.

FIG. 2 illustrates an exemplary block diagram of a UAV 200. UAV 200 may include a processor 202, a sensor array and/or instrument bay 204, a location acquisition unit 206, a communication unit 208, a camera 210, a display 212, a speaker/microphone 214, and a memory 216. In one aspect, UAV 200 is an implementation of one of UAVs 102.1-102.N, as shown in FIG. 1. UAV 200 may include additional, fewer, or alternate components, including those discussed elsewhere herein.

Processor 202 may be implemented as any suitable type and/or number of processors, such as a host processor of UAV 200, for example. To provide additional examples, processor 202 may be implemented as an application specific integrated circuit (ASIC), an embedded processor, a central processing unit (CPU) associated with UAV 200, a graphical processing unit (GPU), etc.

Processor 202 may be configured to communicate with one or more of sensor array and/or instrument bay 204, location acquisition unit 206, communication unit 208, camera 210, display 212, speaker/microphone 214, and/or memory 216 via one or more wired and/or wireless interconnections, such as any suitable number of data and/or address buses, for example. These interconnections are not shown in FIG. 2 for purposes of brevity.

Processor 202 may be configured to operate in conjunction with one or more of sensor array and/or instrument bay 204, location acquisition unit 206, communication unit 208, camera 210, display 212, speaker/microphone 214, and/or memory 216 to process and/or analyze data, to store data to memory 216, to retrieve data from memory 216, to cause instructions, alerts and/or notifications to be displayed via display 212 and/or to be sounded via speaker/microphone 214, to receive, process, and/or interpret communications, commands, and/or controls received via communication unit 208, to receive, process, store, and/or interpret data measured and/or generated via sensor array and/or instrument bay 204, to receive, store, and/or transmit images and/or video captured via camera 210, to execute one or more functions related to the navigation of UAV 200, to receive data from and/or send data to one or more of central monitoring system 150, to another UAV (e.g., one or more of UAVs 102.1-102.N), to one or more of external computing devices 160.1-160.M, etc.

Sensor array and/or instrument bay 204 may be configured to collect/analyze information in accordance with any suitable number of implemented sensors, to store the collected information as drone data in any suitable portion of memory 216, and/or to transmit the drone data to one or more of central monitoring system 150, another UAV (e.g., one or more of UAVs 102.1-102.N), and/or one or more of external computing devices 160.1-160.M.

Sensor array and/or instrument bay 204 may be implemented as any suitable number and/or type of sensors configured to measure, monitor, and/or quantify one or more characteristics of UAV 200's environment as part of collected drone data.

Examples of suitable sensor types implemented by sensor array and/or instrument bay 204 may include one or more accelerometers, gyroscopes, compasses, speedometers, magnetometers, barometers, thermometers, proximity sensors, light sensors (e.g., light intensity detectors), Light Detection and Ranging (LiDAR) sensors, sonar sensors, electromagnetic radiation sensors (e.g., infrared and/or ultraviolet radiation sensors, multispectral sensors), ultrasonic and/or infrared range detectors, thermistors, humistors, hygrometers, altimeters, microphones, etc. Sensor array and/or instrument bay 204 may additionally or alternatively include advanced sensors, for example, that detect and/or receive data associated with temperature measurements, thermal imaging, weather conditions, traffic conditions, etc.

Furthermore, sensor array and/or instrument bay 204 may be implemented as any suitable number and/or type of instruments configured to measure, monitor, and/or quantify one or more characteristics of UAV 200's environment as part of collected drone data. Examples of suitable instrument types implemented by sensor array and/or instrument bay 204 may include one or more soil sample extractors (e.g., coring tools), wood sample extractors, spectrometers, volumetric water content sensors, specialized biometric sensors, soil-testing equipment, specialized imaging equipment, etc.

Location acquisition unit 206 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe.

Location acquisition unit 206 and/or processor 202 may be configured to receive navigational signals from one or more satellites and to calculate a geographic location of UAV 200 using these signals. Location acquisition unit 206 may include one or more processors, controllers, or other computing devices and memory to calculate the geographic location of UAV 200 without processor 202, or location acquisition unit 206 may utilize components of processor 202. Thus, processor 202 and location acquisition unit 206 may be combined or be separate or otherwise discrete elements.

Although aspects of UAV 200 may include a satellite navigation receiver, any suitable location-determining technology may be used. For example, communication unit 208 may determine the location of UAV 200 by receiving data from transmitter locations and then performing basic triangulation calculations to determine the relative position of UAV 200 with respect to the transmitting locations. For example, cellular towers or any customized transmitting radio frequency towers may be used instead of, or in addition to, satellites.

Communication unit 208 may be configured to support any suitable number and/or type of communication protocols to facilitate communications between UAV 200 and one or more other devices, such as one or more of central monitoring system 150, another UAV (e.g., one or more of UAVs 102.1-102.N), one or more of external computing devices 160.1-160.M, and/or mobile computing device 190, for example, as shown in FIG. 1. Communication unit 208 may be configured to send and receive data directly and/or indirectly (e.g., via communication network 170).

Communication unit 208 may be configured to receive any suitable type of information via one or more of central monitoring system 150, another UAV (e.g., one or more of UAVs 102.1-102.N), one or more of external computing devices 160.1-160.M, and/or mobile computing device 190. Furthermore, communication unit 208 may likewise be configured to transmit any suitable type of information to one or more of central monitoring system 150, another UAV (e.g., one or more of UAVs 102.1-102.N), one or more of external computing devices 160.1-160.M, and/or mobile computing device 190. Communication unit 208 may be implemented with any suitable combination of hardware and/or software to facilitate this functionality. For example, communication unit 208 may be implemented having any suitable number of wired and/or wireless transceivers, ports, connectors, antennas, etc.

Camera 210 may be configured to capture one or more digital images and/or video data, for example. In various aspects, camera 210 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality.

Camera 210 may be coupled to one or more servos that are controlled via processor 202 to obtain images and/or video from one or more locations, such as the area surrounding the insured or potentially insured asset 180, for example, as shown in FIG. 1. Camera 210 may include any suitable number of cameras, which may include cameras that capture image data in both the visible and the non-visible spectrum, such as digital and thermal imaging cameras, for example. Camera 210 may be configured to store image data to any suitable portion of memory 216.

Display 212 may be configured to display one or more images, messages, instructions, etc., in response to data received from processor 202. Display 212 may be implemented as any suitable type of display, and may facilitate user interaction with UAV 200. For example, display 212 may be implemented as a capacitive touch screen display, a resistive touch screen display, a standard display (a non-touch display), etc. In various aspects, display 212 may be configured to work in conjunction with processor 202 to detect user inputs upon a user selecting a displayed interactive icon or other graphic, to identify user selections of objects displayed via display 212, to display instructions and/or prompts to facilitate collecting information regarding an insured or potentially insured asset, etc. Additionally or alternatively, information displayed via display 212 may be in the form of audible announcements made via speaker/microphone 214.

In accordance with various aspects, memory 216 may be a computer-readable non-transitory storage device that may include any suitable combination of volatile memory (e.g., a random access memory (RAM) or non-volatile memory (e.g., battery-backed RAM, FLASH, etc.). Memory 216 may be configured to store instructions executable on processor 202, such as the various memory modules illustrated in FIG. 2 and further discussed below, for example. These instructions may include machine readable instructions that, when executed by processor 202, cause processor 202 to perform various acts as described herein.

Navigation module 218 is a region of memory 216 configured to store instructions that, when executed by processor 202, cause processor 202 to perform various acts in accordance with applicable aspects as described herein.

In one aspect, navigation module 218 may be a portion of memory 216 configured to store instructions, that when executed by processor 202, cause processor 202 to control the speed, direction, route, and/or altitude of UAV 200. For example, executable instructions stored in navigation module 218 may enable processor 202 to determine a destination specified as geographic location coordinates received as part of a command via communication unit 208, to determine a current geographic location of UAV 200 via location acquisition unit 206, and/or to execute the appropriate controls to maneuver UAV 200 to the destination.

To provide another example, navigation module 218 may be a portion of memory 216 configured to store instructions, that when executed by processor 202, cause processor 202 to issue a command to another UAV (e.g., one or more of UAVs 102.1-102.N), thereby causing that UAV to navigate to a particular geographic location.

In some embodiments, navigation of UAV 200 may be performed with the assistance of one or more persons controlling UAV 200. For example, personnel associated with central monitoring system 150 may use image and/or video captured by camera 210 as feedback and manually direct UAV 200. For example, a person may use a controller implemented by central monitoring system 150 that receives control inputs that are interpreted, translated, and transmitted as commands to UAV 200.

In other aspects, navigation may be performed by UAV 200 autonomously or with minimal assistance from one or more persons. For example, executable instructions stored in navigation module 218 may enable processor 202 to utilize image and/or video captured by camera 210 and to analyze the image and/or video in accordance with any suitable image recognition, object recognition, and/or machine vision algorithms. UAV 200 may use the outcome of such analyses to complete a requested task.

That is, in manually controlled aspects, UAV 200 may navigate to various locations when being controlled by a person via central monitoring system 150. However, in autonomous or semi-autonomous embodiments, UAV 200 may receive a command having a higher level structure, such as a command requesting UAV 200 to navigate to a particular distance from a home identified in the video (e.g., one that is selected via a user through an appropriate user input gesture), in which case UAV may carry out this task without further user assistance.

Data collection module 220 is a region of memory 216 configured to store instructions that, when executed by processor 202, cause processor 202 to perform various acts in accordance with applicable aspects as described herein. In one aspect, data collection module 220 may be a portion of memory 216 configured to store instructions, that when executed by processor 202, cause processor 202 to collect data associated with one or more locations in which UAV 200 is dispatched or otherwise directed. Similar to the navigation processes described above, UAV 200 may likewise perform data collection processes manually, autonomously, or semi-autonomously.

Regardless of how the data is collected, aspects include UAV 200 collecting drone data that is used to facilitate one or more insurance-related tasks and/or to assess the amount of risk associated with an insured or potentially insured asset. These insurance-related tasks and how the drone data is used for each of these tasks is further discussed below with reference to FIG. 4. The drone data may include, for example, any suitable data received via one or more of sensor array and/or instrument bay 204, location acquisition unit 206, and/or camera 210.

To provide an illustrative example, UAV 200 may be instructed to navigate to an area surrounding the insured or potentially insured asset 180 to collect audio and/or visual data, such as images, video, and/or sound recorded via camera 210 and/or sensor array and/or instrument bay 204. The images or videos may include any suitable content that may be used by an insurance provider for the various insurance-related tasks, as further discussed below. For example, the images or videos may reveal fire hazards, flood risks, other potentially dangerous conditions, weather conditions, etc.

To provide another example, UAV 200 may collect soil and/or wood samples of the soil and/or trees surrounding a home. UAV 200 may analyze the samples to determine soil moisture content, and/or the presence of pests, as well as the age, number of dead sections, and degree of root damage for trees, etc. The analyzed samples may be stored as drone data in any suitable portion of memory 216, and/or transmitted one or more of central monitoring system 150, another UAV (e.g., one or more of UAVs 102.1-102.N), one or more of external computing devices 160.1-160.M, mobile computing device 190, etc.

III. Exemplary Mobile Computing Device

Figure 3:
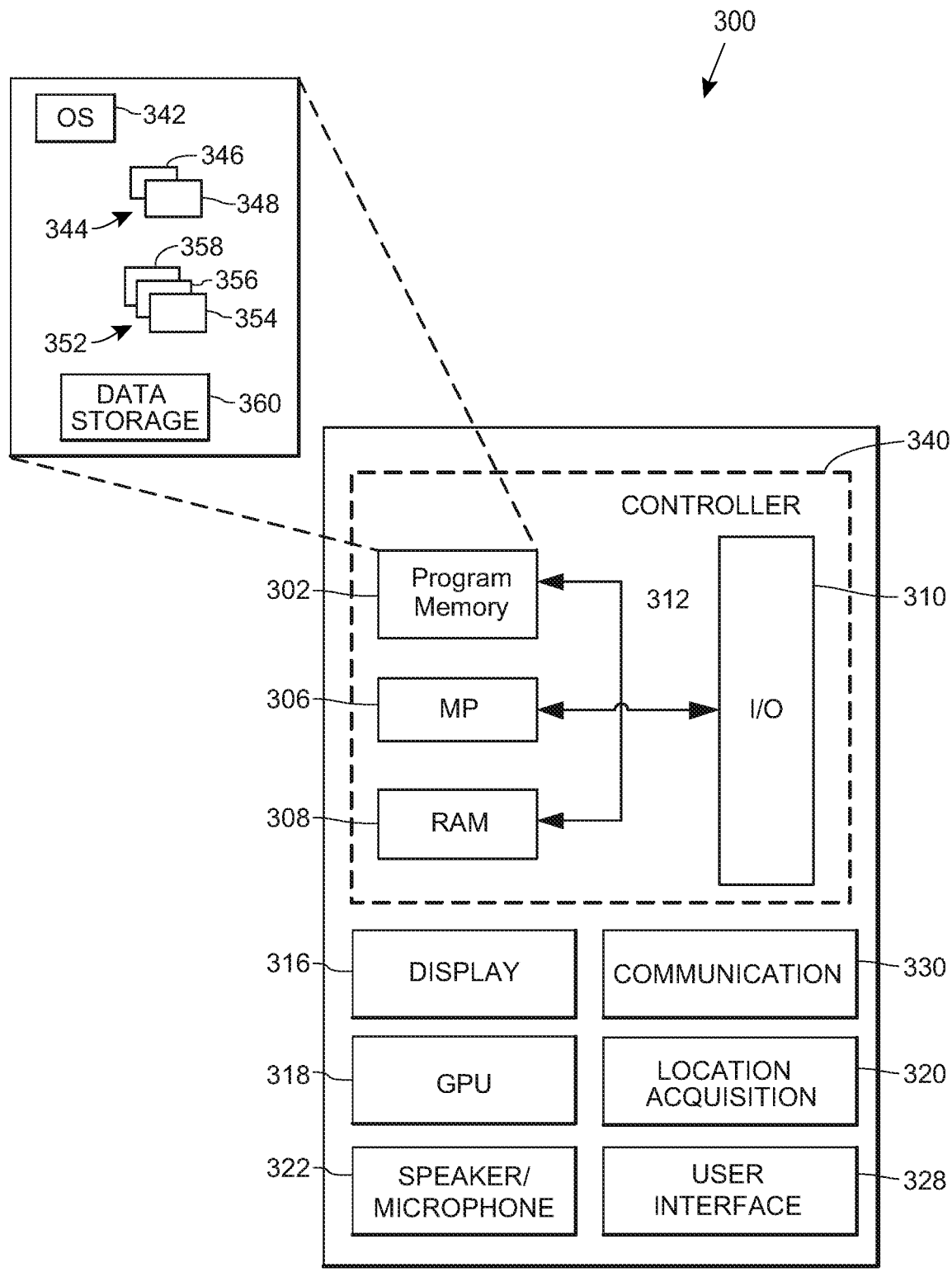
FIG. 3 illustrates an exemplary block diagram of a mobile computing device 300 in accordance with an exemplary aspect of the present disclosure.

FIG. 3 illustrates an exemplary block diagram of a mobile computing device 300. Mobile computing device 300 may be implemented as any suitable computing device. Mobile computing device 300 may be associated with a homeowner, vehicle owner, property owner or any other owner of an insured or potentially insured asset and/or the mobile computing device 300 may be associated with an insurance representative. In one aspect, mobile computing device 300 may be an implementation of mobile computing device 190, as shown in FIG. 1.

Mobile computing device 300 may include a controller 340, a display 316, a graphics processing unit (GPU) 318, a location acquisition unit 320, a speaker/microphone 322, a user interface 328, and a communication unit 330. Mobile computing device 300 may include additional, fewer, or alternate components, including those discussed elsewhere herein.

Controller 340 may include a program memory 302, a microprocessor (MP) 306, a random-access memory (RAM) 308, and an input/output (I/O) interface 310, each of which may be interconnected via an address/data bus 312. Controller 340 may be implemented with any suitable type and/or number of processors, such as a host processor of mobile computing device 300, for example. In some aspects, controller 340 may be configured to communicate with additional data storage mechanisms not shown in FIG. 3 for purposes of brevity (e.g., one or more hard disk drives, optical storage drives, solid state storage devices, etc.) that may reside within and/or are otherwise associated with mobile computing device 300.

Program memory 302 may store data used in conjunction with one or more functions performed by mobile computing device 300 to facilitate the interaction between mobile computing device 300 and one or more other devices (e.g., one or more of central monitoring system 150, one or more of UAVs 102.1-102.N, and/or one or more of external computing devices 160.1-160.M). For example, program memory 302 may store one or more programs, applications, algorithms, etc. that, when executed by controller 340, facilitate the interaction between mobile computing device 300 and one or more networks (e.g., communication network 170).

In various aspects, program memory 302 may be implemented as a non-transitory tangible computer readable media configured to store computer-readable instructions that, when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs 306 may be configured to execute one or more of software applications 344, software routines 352 residing in program memory 302, and/or other suitable software applications. For example, operating system 342 may be implemented as any suitable operating system platform depending upon the particular implementation of mobile computing device 300. Operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one aspect, data storage 360 may store data such as application data for the one or more software applications 344, routine data for the one or more software routines 352, user login credentials, received insurance-related information, received insurance policy data, etc.

Display 316 may be implemented as any suitable type of display and may facilitate user interaction with mobile computing device 300 in conjunction with user interface 328. For example, display 316 may be implemented as a capacitive touch screen display, a resistive touch screen display, etc. In various aspects, display 316 may be configured to work in conjunction with controller 340 and/or GPU 318 to display one or more fields for user input, to display insurance pricing such as premium quotes, adjustments to insurance premiums, etc.

Location acquisition unit 320 may be configured to generate geographic location data utilizing any suitable global positioning techniques. For example, location acquisition unit 320 may communicate with one or more satellites and/or wireless transmitters to determine a location of mobile computing device 300. Location acquisition unit 320 may function independently or in conjunction with one or more components of mobile computing device 300. For example, location acquisition unit 320 may work in conjunction with communication unit 330 to utilize cellular location data received via communications unit 330 and implement "Assisted Global Positioning System" (A-GPS). To provide additional examples, location acquisition unit 318 may work as an independent unit implementing satellite GPS, or any other suitable global positioning protocol (e.g., the GLONASS system operated by the Russian government, the Galileo system operated by the European Union, etc.) to determine a geographic location of mobile computing device 300.

Communication unit 330 may be configured to facilitate communications between mobile computing device 300 and one or more other devices, such as central monitoring system 150, one or more of UAVs 102.1-102.N, one or more of external computing devices 160.1-160.M, etc. In various aspects, mobile computing device 300 may be configured to communicate with these other devices in accordance with any suitable number and/or type of communication protocols. Thus, in various aspects, communication unit 330 may be implemented with suitable hardware, firmware, and/or software to support any suitable number and type of communication protocols in accordance with the various aspects described herein.

Communication unit 330 may be configured to support separate or concurrent communications, which may be the same type of communication protocol or different types of communication protocols. For example, communication unit 330 may be configured to facilitate communications between mobile computing device 300 and one or more backend components (e.g., one or more of central monitoring system 150, and/or external computing devices 160.1-160.M) via a cellular communications protocol while facilitating communications between mobile computing device 300 and one or more UAVs 102.1-102.N via a personal area network communications protocol, a Wi-Fi protocol (e.g., Wi-Fi direct), etc.

Speaker/microphone 322 may be configured as one or more devices. Speaker/microphone 322 may include a microphone configured to detect sounds and to convert detected sounds to data suitable for voice recognition analysis, for storage in data storage 360, for communications via communications unit 330, etc. Speaker/microphone 322 may additionally or alternatively include a speaker configured to play sounds in response to data received from one or more components of mobile computing device 300 (e.g., controller 340 and/or communication unit 330).

User interface 328 may be implemented as any suitable device configured to collect user input, such as a "soft" keyboard displayed on display 316, a keyboard attached to mobile computing device 300, an external keyboard communicating via a wired or a wireless connection (e.g., a BLUETOOTH keyboard), an external mouse, etc.

In one aspect, software applications 344 may include an insurance quote application 346, which may be implemented as a series of machine-readable instructions for executing one or more functions described herein. In another aspect, insurance quote application 346 may cooperate with one or more other hardware or software components of mobile computing device 300 to perform these functions.

For example, insurance quote application 346 may include various instructions for facilitating, reporting, or otherwise communicating information to an insurance provider, which may be used by the insurance provider for various insurance-related purposes and are further discussed below with reference to FIG. 4. In one aspect, when launching insurance quote application 346, a user may enter login credentials which may be verified by one or more external computing devices, servers, etc. (e.g., one or more of external computing devices 160.1-160.M). These login credentials may be associated with insurance provider profile data, such as insurance policy numbers, vehicles insured, buildings or structures insured, vehicle identification numbers of insured vehicles, contact information, premium rates, discounts, etc. In this way, communications from mobile computing device 300 allow central monitoring system 150 and/or one or more of external computing devices 160.1-160.M to uniquely identify the customer so that any collected data, via mobile computing device 300 and/or via one or more UAVs 102.1-102.N, may be saved and later referenced to the customer and any insurance policies associated with that customer.

For example, insurance quote application 346 may facilitate the determination of a geographic location of mobile computing device 300 (e.g., via communications with location acquisition unit 320) and communicate this information to one or more of central monitoring system 150, one or more of UAVs 102.1-102.N, and/or one or more of external computing devices 160.1-160.M. To provide additional examples, insurance quote application 346 may facilitate instructions and/or prompts being displayed via display 316 guiding a user to collect data associated with an insured or potentially insured asset (e.g., images of a home, images of an area surrounding the home, homeowner information, etc.).

To provide an additional example, insurance quote application 346 may facilitate a user requesting one or more UAVs 102.1-102.N to the insured or potentially insured asset, which may be specified, for example, by the geographic location of mobile computing device 300. In this example, the user may be an insurance representative who may request the UAVs 102.1-102.N to capture additional information regarding the insured or potentially insured asset. Alternatively, in this example, the user may be an owner of the insured or potentially insured asset who selects an option to request the UAVs 102.1-102.N to collect data associated with the insured or potentially insured asset. In accordance with various embodiments, a user may utilize mobile computing device 300 to request one or more of UAVs 102.1-102.N via communications with a UAV 102.1-102.N, by sending a request to one or more of central monitoring system 150, and/or by sending a request to one or more of external computing devices 160.1-160.M. One or more of central monitoring system 150 and/or one or more of external computing devices 160.1-160.M may process these requests manually, automatically, or semi-automatically to dispatch one or more UAVs 102.1-102.N to the requested insured or potentially insured asset.

In some aspects, insurance quote application 346 may facilitate communications with one or more of central monitoring system 150, one or more of UAVs 102.1-102.N, and/or one or more of external computing devices 160.1-160.M to receive an estimated time in which one or more UAVs 102.1-102.N may arrive at the insured or potentially insured asset, which may be relayed to a user using any suitable techniques (e.g., via display 316).

Software applications 344 may include a web browser 348. In some aspects, web browser 348 may be a native web browser application, such as Apple's Safari®, Google Android™ mobile web browser, Microsoft Internet Explorer® for Mobile, Opera Mobile™, etc. In other embodiments, web browser 348 may be implemented as an embedded web browser. Regardless of the implementation of web browser 348, various aspects include web browser 348 being implemented as a series of machine-readable instructions for interpreting and displaying web page information received from one or more backend components. This web page information may be utilized in conjunction with insurance quote application 346 to perform one or more function of the aspects as described herein.

In one embodiment, software routines 352 may include a data collection routine 354, a UAV request routine 356, and/or a feedback routine 358. Data collection routine 354 may include instructions, that when executed by controller 340, facilitate the collection of audio, video, thermal signature, soil sample, wood sample, chemical data, and/or image data associated with an insured or potentially insured asset.

For example, data collection routine 354 may include instructions that, when executed by controller 340 in conjunction with insurance quote application 346, present a user with instructions and/or prompts to collect images, video, etc. Data collection routine 354 may include instructions that, when executed by controller 340 in conjunction with insurance claim application 346, store the collected data as one or more data files in data storage 360 and/or cause the collected data to be transmitted via communication unit 330 to one or more external computing devices 160.1-160.M. External computing devices 160.1-160.M may use this data in addition to or as an alternative to the collected drone data to perform various insurance-related tasks, which are further discussed below with reference to FIG. 4.

UAV request routine 356 may include instructions, that when executed by controller 340, facilitate the dispatching of one or more UAVs 102.1-102.N to a location specified by a user, which may be an area surrounding the insured or potentially insured asset, for example. In one aspect, UAV request routine 356 may include instructions that, when executed by controller 340 in conjunction with insurance quote application 346, display one or more options to a user to request one or more UAVs 102.1-102.N, to determine and/or transmit the requested UAV delivery location, and/or to transmit the request via communication unit 330.

Feedback routine 358 may include instructions, that when executed by controller 340, supports user interaction with mobile computing device 300. For example, controller 340 may execute instructions stored in feedback routine 358 to obtain information from a user and/or to provide the user with information received from one or more of UAVs 102.1-102.N, central monitoring system 150, and/or one or more of external computing devices 160.1-160.M. To provide another example, controller 340 may execute instructions stored in feedback routine 358 to display one or more prompts, to view insurance-related data such as insurance provider profile data, to view updated insurance-related data such as new calculated insurance premiums, the status of the insurance underwriting process, etc.

Although each of the components in FIG. 3 are illustrated as separate units or modules, any components integrated as part of mobile computing device 300 may be combined and/or share functions. For example, controller 340, GPU 318, and program memory 302 may be integrated as a single processing unit. Furthermore, although connections are not shown between the individual components of mobile computing device 300, mobile computing device 300 may implement any suitable number of wired and/or wireless links to facilitate communication and interoperability between these components.

For example, program memory 302, communication unit 330, and/or display 316 may be coupled via wired buses and/or wireless links to controller 340 and/or GPU 318 to facilitate communications between these components and/or to enable these components to accomplish their respective functions as described throughout the present disclosure. Furthermore, although FIG. 3 illustrates mobile computing device 300 having a single program memory 302, mobile computing device 300 may implement any suitable number and/or combination of memory systems.

Additionally, although FIG. 3 depicts controller 340 as including one program memory 302, one MP 306, and one RAM 308, controller 340 may include any suitable number of these components. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

IV. Exemplary External Computing Device

Figure 4:
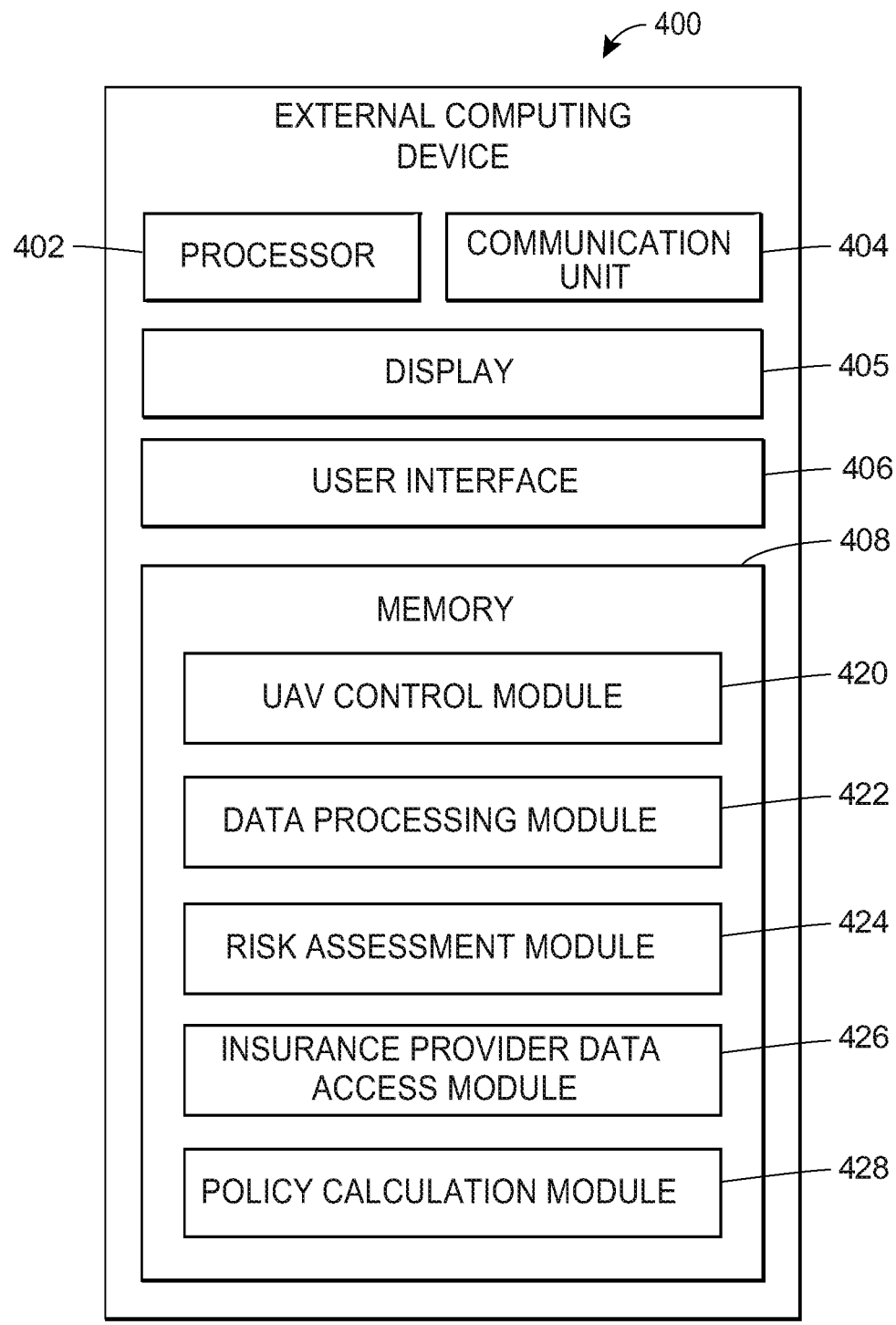
FIG. 4 illustrates an exemplary block diagram of an external computing device 400 in accordance with an exemplary aspect of the present disclosure.

FIG. 4 illustrates an exemplary block diagram of an external computing device 400. In various aspects, external computing device 400 may be an implementation of central monitoring system 150 or one or more of external computing devices 160.1-160.M, as shown in FIG. 1. External computing device 400 may include a processor 402, a communication unit 404, a display 405, a user interface 406, and a memory 408. External computing device 400 may include additional, fewer, or alternate components, including those discussed elsewhere herein.

Processor 402 may be implemented as any suitable type and/or number of processors, such as a host processor of external computing device 400, for example. To provide additional examples, processor 402 may be implemented as an application specific integrated circuit (ASIC), an embedded processor, a central processing unit (CPU) associated with external computing device 400, a graphical processing unit (GPU), etc.

Processor 402 may be configured to communicate with one or more of communication unit 404, display 405, user interface 406, and/or memory 408 via one or more wired and/or wireless interconnections, such as any suitable number of data and/or address buses, for example. These interconnections are not shown in FIG. 4 for purposes of brevity.

Processor 402 may be configured to operate in conjunction with one or more of communication unit 404, display 405, user interface 406, and/or memory 408 to process and/or analyze data, to store data to memory 408, to retrieve data from memory 408, and/or to perform one or more insurance-related functions. For example, processor 402 and communication unit 404 may facilitate receiving data from and/or sending data to one or more devices, such as central monitoring system 150, mobile computing device 200, one or more UAVs 102.1-102.N, etc.

Communication unit 404 may be configured to facilitate communications between external computing device 400 and one or more other devices. For example, in aspects in which external computing device 400 is an implementation of one or more of external computing devices 160.1-160.M, as shown in FIG. 1, communication unit 404 may facilitate communications between external computing device 400 and one or more UAVs 102.1-102.N, mobile computing device 190, and/or central monitoring system 150.

In various aspects, external computing device 400 may be configured to communicate with these other devices in accordance with any suitable number and type of communication protocols. Thus, in various aspects, communication unit 404 may be implemented with suitable hardware, firmware, and/or software to support any suitable number and type of communication protocols in accordance with the various aspects described herein.

Display 405 may be implemented as any suitable type of display and may facilitate user interaction with external computing device 400 in conjunction with user interface 406. For example, display 405 may be implemented as a capacitive touch screen display, a resistive touch screen display, etc. In various aspects, display 405 may be configured to work in conjunction with processor 402 and/or user interface 406 to display drone data received from one or more UAVs, to display data received from one or more mobile computing devices (e.g., requests for UAVs to be sent to the insured or potentially insured asset), to display the result of various insurance-related calculations, to display the location of one or more UAVs, to display insurance profile data and/or other information associated with an insured person, to provide a graphical user interface (GUI) to facilitate the control and/or monitoring of one or more UAVs, etc.

User-interface 406 may be implemented as any suitable device configured to collect user input, such as a "soft" keyboard displayed on display 405, a keyboard attached to external computing device 400, an external keyboard communicating via a wired or a wireless connection (e.g., a BLUETOOTH keyboard), specialized joystick controls configured to control one or more UAVs, an external mouse, etc.

In various aspects, memory 408 may be implemented as a non-transitory tangible computer readable media configured to store computer-readable instructions, that when executed by processor 402, cause processor 402 to perform various acts. Program memory 408 may store one or more modules, which may be executed by processor 402 in conjunction with one or more other hardware or software components of external computing device 400 to facilitate the execution of one or more functions related to the various aspects, as further discussed below.

UAV control module 420 may include instructions to facilitate monitoring and/or controlling of one or more UAVs, such as UAVs 102.1-102.N, for example, as shown in FIG. 1. UAV control module may include instructions that, when executed by processor 402, enables processor 402 to process data sent by one or more UAVs, to identify one or more UAVs, to determine a status of one or more UAVs, and/or to transmit commands to one or more UAVs.

For example, processor 402 may receive periodic transmissions sent by one or more UAVs, and these transmissions may include a unique UAV identifier, a current geographic location of each UAV, a UAV status (e.g., en route to location, collecting data, charging and/or refueling, etc.), and/or a confirmation of receipt of a command sent to one or more UAVs. In some aspects, processor 402 may use this information to command one or more UAVs to navigate to a specific geographic location or to return to a predetermined "base" location, which may be used for refueling, recharging, and/or maintenance, for example.

In some aspects, a user may interact with external computing device 400 to perform control over one or more UAVs by, for example, watching video data and/or geographic location data received from one or more UAVs shown on display 405 and sending commands to one or more UAVs using this feedback. Information shown on display 405 for UAV control may include, for example, live video data, a map overlaid onto the UAV's current geographic location, etc.

In accordance with such aspects, processor 402 may execute instructions stored in UAV 402 to process controls received via user interface 406 (e.g., adjustments to altitude, speed, yaw, pitch, roll, direction, etc.), and convert these controls to data that is sent in a UAV control transmission, which may be transmitted via communication unit 404, for example.

When controlled by a user, external computing device 400 may function as a UAV dispatching center, receiving instructions to dispatch one or more UAVs and then navigating the one or more UAVs to the requested geographic locations, which may include an area surrounding the insured or potentially insured asset. For example, personnel trained to control UAVs may monitor communications received via communication unit 404, which may be forwarded from a call center, received as a request sent via a mobile computing device, etc.

In other aspects, one or more UAVs may be controlled without (or with minimal) user intervention. In accordance with such aspects, external computing device 400 may function as a UAV dispatching center, but a person may not need to manually control one or more UAVs. For example, UAV requests may be received by external computing device 400 in an automated fashion, such as requests sent via a mobile computing device or via another Internet-enabled device, for example. In accordance with such aspects, these requests may include the geographic location of a requested UAV destination and/or details regarding the type of data to be collected upon the UAV reaching the destination.

In accordance with such aspects, processor 402 may execute instructions stored in UAV control module 420 to process these requests, determine a navigation route for one or more UAVs, and transmit the appropriate commands to one or more UAVs to ensure the UAV arrives at the requested geographic location. In various aspects, processor 402 may utilize live video data received from a UAV, weather conditions, and/or any other suitable data to safely guide the UAV to the requested location.

For example, processor 402 may execute instructions stored in UAV control module 420 analyze live video data received from a UAV in accordance with any suitable image recognition, object recognition, and/or machine vision algorithms to guide the UAV to a specific geographic location with little or no user intervention. In some aspects, the one or more UAVs may store collected drone data in a rolling buffer, periodically transmit collected drone data to an external computing device, etc.

Regardless of how external computing device 400 controls one or more UAVs, aspects include processor 402 executing instructions stored in UAV control module 420 to send one or more commands to one or more UAVs which, upon receiving by the commands, execute them to collect various types of data. For example, processor 402 may execute instructions stored in UAV 402 to send data in a UAV control transmission, which may be transmitted via communication unit 404, for example. This data may indicate specific commands which may be manually sent by a user and/or automatically sent upon a particular condition being satisfied, for example (e.g., the UAV arriving within a threshold distance of the destination).

The data collection commands may include any suitable command for the collection of drone data, such as recording audio and/or video of the insured or potentially insured asset, for example, for determining physical characteristics of the insured or potentially insured asset such as the size, height, shape, materials, slope and/or grade of the lot where the insured or potentially insured asset sits, or for determining current conditions of components of the insured or potentially insured asset such as the condition of roof, siding, windows, or doors of a home, recording audio and/or video of an area surrounding the insured or potentially insured asset, such as within a 100 yard radius, requesting the weather conditions at the insured or potentially insured asset, requesting the temperature of the insured or potentially insured asset, requesting soil and wood samples of soil and/or trees surrounding the potentially insured asset, requesting an analysis of the type and/or amount of chemicals present at the insured or potentially insured asset, etc.

Data processing module 422 may include instructions to facilitate the collection of drone data from one or more UAVs, such as UAVs 102.1-102.N, for example, as shown in FIG. 1. Additionally or alternatively, data processing module 422 may include instructions to facilitate the collection of other sources of data, such as data received via one or more mobile computing devices, for example.

Data processing module 422 may include instructions that, when executed by processor 402, enable processor 402 to process drone data sent by one or more UAVs, to store the drone data in memory 408 and/or another suitable storage device (e.g., one or more databases in which external computing device 400 is connected), and/or to transmit the drone data to one or more other external computing devices.

For example, once a UAV is dispatched to an area surrounding an insured or potentially insured asset, the UAV may proceed to collect drone data, as previously discussed above with reference to the instructions stored in UAV control module 420. In various aspects, processor 402 may execute instructions stored in data processing module 422 to receive this data from the one or more UAVs, to parse the data, and/or to correlate the data so that specific drone data may be later identified and associated with the particular type of data to which it corresponds.

To provide an illustrative example, processor 402 may execute instructions stored in data processing module 422 to receive live video and/or audio data recorded by a UAV, which may include various types of information used to assess the amount of risk present in an insured or potentially insured asset. In one aspect, this video may be time stamped by the UAV and/or by external computing device 400 to indicate when each command was sent and/or when each different type of data was recorded. Also, data processing module 422 may determine the proximity of objects included in the video to the insured or potentially insured asset (e.g., trees, fire hydrants, swimming pools, other properties and/or lots, rivers, coastlines, earthquake faults, etc.).

In this way, external computing device 400 may receive the data, parse the data, reference the timestamps to the commands sent, and label and/or store the parsed collected drone data in a way such that it may be easily identified/filtered. For example, drone data may include video of the insured or potentially insured asset taken at several different times (e.g., when a homeowner initially purchases homeowners' insurance and also upon each subsequent renewal of the homeowners' insurance policy) and locations (e.g., from above the home, behind the home, in front of the home, 50 yards north of the home).

In another example, drone data may include video of trees and/or other objects which are not in close proximity to an insured home (e.g. more than 50 yards, more than 100 yards, more than 200 yards, etc.). As a result, the drone data may not be relevant to assessing risk and may be filtered out. Aspects include processor 402 executing instructions stored in data processing module 422 to separate these videos and store them with a suitable header, filename, label, etc., so that this data can be easily identified, accessed, read, viewed, processed, etc.

In yet another example, data processing module 422 may perform image processing of image and/or video data recorded by the UAV to identify various objects within the image and/or video, such as a fence surrounding a home, trees, a garage, a fire hydrant, a swimming pool, a roof of the home, a security system, etc. Various image processing techniques such as edge detection may be used by the data processing module to identify the objects.

Risk assessment module 424 may include instructions to facilitate the calculation of the total amount of risk associated with insuring the asset using data collected from one or more UAVs, such as UAVs 102.1-102.N, for example, as shown in FIG. 1. Risk assessment module 424 may include instructions that, when executed by processor 402, enable processor 402 to assess risk in accordance with any suitable number and type of risk assessment algorithms, calculations, manual review, etc., to store risk assessment data indicative of the risk assessment determination in memory 408 and/or another suitable storage device (e.g., one or more databases in which external computing device 400 is connected), and/or to transmit the risk assessment data to one or more other external computing devices.

In one aspect, risk assessment module 424 may identify one or more risk elements through an analysis of the collected drone data that matches various risk parameters included in a risk element profile. For example, risk elements may include a risk of fire, a flood risk, a risk of sewer and/or drain backup, a natural disaster risk, a risk of fraud, a financial risk, a security risk, a risk based upon the condition of the asset such as a weak foundation, a risk based upon the physical characteristics of the asset such as the size, height, shape, materials, and slope and/or grade of the lot where the insured or potentially insured asset sits, a risk of a tree falling, a risk from hazardous objects, etc.

A natural disaster risk may be the risk that the insured or potentially insured asset is damaged by a tornado, a hurricane, an avalanche, an earthquake, a flood, a tsunami, a volcanic eruption, a hail storm, a wildfire, a thunderstorm, etc. This risk may be determined based upon the location of the insured or potentially insured asset. For example, homes in the Midwestern United States may be at risk for a tornado whereas homes in the Southeastern United states may be at risk for a hurricane. Additionally, the risk may be determined based upon the types of materials used in the construction of the insured or potentially insured asset. For examples, some homes may be built with fire-resistant siding and/or earthquake-resistant foundations.

A risk of fraud may be the risk that the policyholder files a fraudulent claim related to the insured or potentially insured asset. The risk of fraud may be determined based upon previously filed claims by the policyholder, or any other suitable indication that the policyholder may or may not be likely to file a fraudulent claim. A financial risk may be the risk that the policyholder defaults on her premium payments. The financial risk may be determined based upon the policyholder's credit history, or any other suitable indication that the policyholder may default on premium payments.

A security risk may be the risk that the insured or potentially insured asset or property within the insured or potentially insured asset is stolen, damaged, or destroyed by an unauthorized person. The security risk may be determined based upon the location of the insured or potentially insured asset (e.g., whether it is in a location with a high crime rate) and/or based upon an amount of security measures taken to protect the insured or potentially insured asset or property within the insured or potentially insured asset. For example, the security risk may be determined based upon whether a garage is present to reduce the risk of theft to an insured car on the property, whether there is a fence surrounding the property, whether the property includes a home security system, etc.

A risk based upon the physical characteristics of the insured or potentially insured asset may be the amount of risk based upon the size of the insured or potentially insured asset. For example, a larger asset may be more expensive and may cost more to rebuild. As in the garage example above, the security risk may decrease by installing a garage but the risk based upon physical characteristics may increase based upon the increased size of the home with the new addition. A risk based upon physical characteristics may also include the amount of risk based upon the materials used in the construction of the insured or potentially insured asset. Higher quality materials may be more expensive to replace, but may also be less likely to require repairs or replacement. For example, asphalt shingles for the roof of a home may be more likely to blow off in high winds than slate. However, slate may be much more expensive than asphalt shingles and therefore may have a higher risk due to the replacement cost. Additionally, the risk based upon the physical characteristics may also include the amount of risk based upon the height or number of stories of the insured or potentially insured asset, and/or the amount of risk based upon overhangs, porches, balconies, or garages attached to the insured or potentially insured asset.

A risk from hazardous objects may be the risk that the insured or potentially insured asset is damaged and/or destroyed from a hazardous object and/or the risk that the policyholder or someone on the property is injured by the hazardous object. Hazardous objects may include for example, swimming pools, trampolines, playgrounds, chemical hazards such as carbon monoxide and/or chemical waste, sinkholes, pests, etc.

In addition to receiving drone data collected from the UAVs, risk assessment module 424 may also receive data collected from other remote servers, computing devices, and/or third parties. For example, risk assessment module 424 may retrieve credit reports from credit reporting agencies to assess financial risk for the policyholder. Moreover, risk assessment module 424 may retrieve loss history reports of previous insurance claims filed by the policyholder from loss history reporting agencies to assess a risk of fraud for the policyholder.

In one aspect, each risk element may correspond to a risk element profile which may include various risk parameters that are combined and/or weighted to identify whether the asset is associated with the risk element. For example, if the asset is a home and the risk element is a risk of fire, the risk parameters included in the risk element profile may be a number of trees and/or other vegetation within close proximity to the home (e.g., within 10 yards, 50 yards, 100 yards, etc.), a thermal signature for the home, a number of outdoor grills for the home, whether there is a natural gas line, a number of exposed electrical wires, a distance from the home to the nearest fire hydrant and/or fire department, whether the home is located in a fire prone region, whether the home has combustible siding, etc. Risk assessment module 424 may identify a risk of fire for the home by comparing the collected drone data to the risk parameters in the risk element profile. Additionally, the risk element profile may include various combinations or weights to assign to the risk parameters based upon drone data associated with previous occurrences of a risk element (e.g., previous fires, previous floods, etc.) to identify the risk element.

In another example, if the asset is insured and the insurance policy is up for renewal and/or or circumstances have changed in such a manner that the insurance provider requires re-underwriting, the risk element profile may include various parameters for comparing characteristics of the insured asset to previous characteristics of the insured asset during the initial underwriting process. For example, the risk element profile may store previous drone data which was collected during the initial underwriting process, such as images of a roof. The previous drone data may then be compared to current drone data collected during re-underwriting to determine, for example whether the condition of the roof has changed. If the condition of the roof has changed by more than a predetermined threshold amount (e.g. from good to fair), the amount of risk associated with the condition of the roof may increase or decrease accordingly. Furthermore, if physical characteristics of the roof have changed such as the size or roofing materials, the amount of risk associated with the roof may increase or decrease accordingly. As a result, insurance policy data, such as an insurance premium, for the renewed insurance policy may be adjusted. On the other hand, if the condition of the roof has not changed by more than a predetermined threshold amount, the amount of risk associated with the condition of the roof determined during the initial underwriting process may be applied in the re-underwriting process.

Additionally, the risk element profile may store previous drone data related to trees surrounding the home during the initial underwriting process. If the current drone data indicates that many of the trees have been removed, the amount of risk associated with the risk of fire and/or the risk of trees falling may decrease. As a result, the insurance premium may be reduced for the renewed insurance policy.

In some embodiments, the risk element profile may be used to determine a likelihood of the risk element occurring (e.g. a flood occurring) based upon various combinations or weights assigned to the risk parameters. Risk assessment module 424 may identify the risk element as associated with the asset if the likelihood of the risk element occurring is above a predetermined threshold likelihood (e.g., 0.1, 0.3, 0.5, 0.7, etc.). For example, if a home has one outdoor grill the risk element profile may indicate that the likelihood of a fire may be 0.01. On the other hand, if a home has four fireplaces, the risk element profile may indicate that the likelihood of a fire is 0.08. However, if the home is within 100 yards of a fire hydrant, for example, the likelihood of a fire may decrease in half.

For each risk element associated with the asset, the corresponding risk element profile may also include various amount parameters to determine an amount of risk. For example, if the thermal signature for the surface of the roof of the home includes an average temperature of 120 degrees Fahrenheit, the risk element profile may indicate a higher risk of the roofing materials deteriorating than if the average temperature is 90 degrees Fahrenheit.

In some embodiments, the amount of risk for a risk element may include a combination and/or aggregation of a likelihood of the corresponding risk element occurring (e.g., the likelihood of a fire occurring) and an amount of potential damage to the asset if the corresponding risk element occurs. For example, the risk element profile may indicate that the likelihood of a hurricane damaging a home in South Carolina is 0.001. However, the risk element profile may indicate that when a hurricane damages a house in South Carolina, 60 percent of the house is destroyed. Also in some embodiments, the amount of risk for each risk element may be a numeric score, for example from one to a hundred, may be a likelihood, may be a percentage, may be a category from a set of categories such as "High," "Medium," "Low," and/or may be represented in any other suitable manner.

Risk assessment module 424 may combine, aggregate, weight, and/or scale the amount of risk for each risk element associated with the asset to determine a total amount of risk. As in the example above, if risks of fire are associated with a higher level of risk than financial risks, the amount of risk associated with the risk of fire may be multiplied by a factor of two when combined with the amount of risk associated with the financial risk. In another example, risk assessment module 424 may combine, aggregate, weight and/or scale the amount of risk for each risk element which corresponds to the insured or potentially insured asset to determine a first amount of risk. Risk assessment module 424 may also may combine, aggregate, weight and/or scale the amount of risk for each risk element which corresponds to an area which surrounds the insured or potentially insured asset to determine a second amount of risk. The first and second amounts of risk may be combined, aggregated, weighted and/or scaled to determine a total amount of risk associated with the insured or potentially insured asset.

Insurance provider data access module 426 may include instructions to facilitate external computing device 400 accessing, reading, storing, and/or updating insurance provider data. For example, an insurance provider may store insurance policy data associated with policyholders, their policy information, policy numbers, profile data, current premiums, the name of persons insured and their contact information, vehicles insured, vehicle identification numbers of insured vehicles, discounts in which the policyholders may be qualified for and/or currently taking advantage of, a history of previous claims, etc. This insurance policy data may be stored across several external computing devices, on one or more databases and/or storage devices, etc.

In one aspect, processor 402 may execute instructions stored in insurance provider data access module 426 to facilitate accessing this data and/or manipulating this data. For example, a policyholder may request an insurance quote or request renewal of an insurance policy using her login credentials. The login credentials may be used by external computing device 400 to access the insurance policy data for the policyholder in a secure manner. As drone data is collected, processor 402 may associate the collected drone data and/or the total amount of risk for the policyholder's asset with her insurance policy data on file, appending, storing, or otherwise referencing the collected drone data and/or risk assessment to the policyholder's insurance data.

Policy calculation module 428 may include instructions to facilitate external computing device 400 calculating pricing related to one or more insurance policies (e.g., an insurance premium) based upon the total amount of risk for the asset. For example, an insurance provider may calculate insurance pricing for homeowners' insurance of the policyholder's home based upon the risks associated with a flood occurring in the home, a fire occurring in the home, a natural disaster striking the home, an injury to a person within the home, damage to the home from objects surrounding the home, the value of the home, etc., any of which may be revealed as part of the drone data collection process discussed herein.

In one aspect, processor 402 may execute instructions stored in policy calculation module 428 to reassess and/or recalculate pricing related to one or more insurance policies based upon the total amount of risk for the asset. This may include, for example, increasing premiums when the condition of the home has declined since the initial underwriting process. Policy calculation module 428 may include instructions to facilitate the calculation of insurance pricing using any suitable techniques, which may include traditional techniques that utilize the collected drone data.

Processor 402 may execute instructions stored in insurer data access module 426 to update the insurance data with an updated insurance pricing. Further in accordance with such aspects, processor 402 may execute instructions stored in policy calculation module 428 to cause external computing device 400 to transmit the updated insurance pricing to a mobile computing device (e.g., to mobile computing device 200 via communication unit 404). In one aspect, the mobile computing device, upon receiving the updated insurance pricing data, may display the updated insurance pricing data related to the user's insurance policy. In this way, a policyholder may receive updates regarding the impact of changed conditions to an insured asset on the policyholder's premiums, a loss of discounts, etc.

V. Exemplary Method for Underwriting Insurance Based Upon Drone Data

Figure 5:
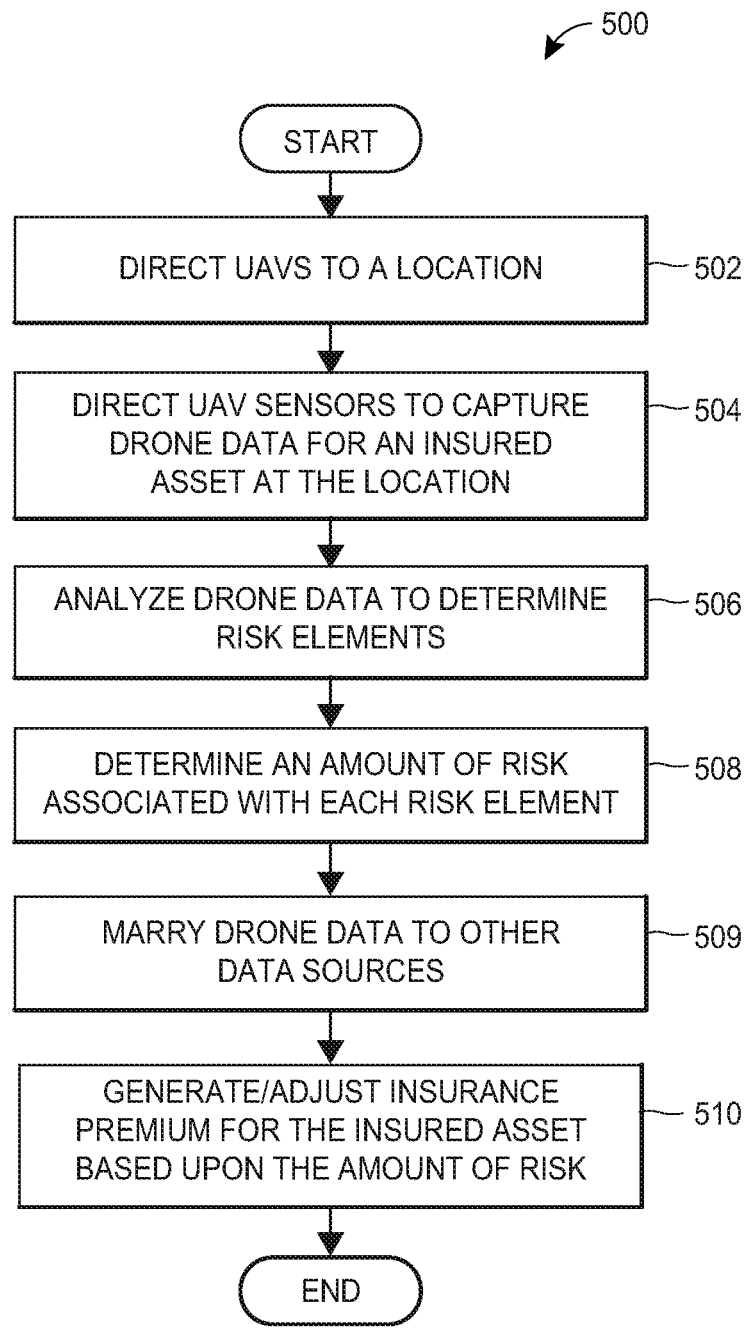
FIG. 5 illustrates an exemplary computer-implemented method 500 for underwriting insurance based upon drone data in accordance with an exemplary aspect of the present disclosure.

FIG. 5 illustrates an exemplary computer-implemented method 500 for underwriting insurance based upon drone data. In the present aspect, method 500 may be implemented by any suitable computing device (e.g., central monitoring system 150 and/or one or more of external computing devices 160.1-160.M, as shown in FIG. 1). In the present aspect, method 500 may be performed by one or more processors, applications, and/or routines, such as processor 402 executing instructions in one or more module stored in memory 408, for example, as shown in FIG. 4.

At block 502, one or more UAVs such as UAVs 102.1-102.N, for example, as shown in FIG. 1 may be directed to an area surrounding an insured or potentially insured asset. For example, the UAVs may be directed to a set of geographic coordinates defined by a geofence which surrounds the insured or potentially insured asset.

In any event, once the UAVs arrive at the location, the UAVs may be directed to capture drone data (block 504). In some embodiments, the UAVs may be directed to capture the drone data at several positions within the geofenced geographic location. For example, if the insured or potentially insured asset is a home, the UAVs may be directed to capture drone data on the roof of the home, from the yard and/or lot surrounding the home, from behind the home, from the street adjacent to the home, etc.

The drone data may include, for example, an image of the roof of a home to determine its age and/or condition, proximity of the home to water sources such as river or coastlines to assess flood risks, proximity of the home to chemical waste such as a factory which produces hazardous materials, number of fire escapes and/or fire exits, whether the home has recently added additions that need to be additionally insured, whether the home has a pool that could represent a higher risk of a person drowning (e.g., if there is no fence surrounding the pool), proximity of the home to fire hydrants, proximity of the home to another property and/or lot, proximity of the home to earthquake faults, the slope and/or grade of the lot which the home sits on, whether the home is close to land that may present a risk of sinkholes, avalanches, and/or mudslides, a thermal signature for the home to determine a risk of damage to the roof or other components of the home, chemicals in the air surrounding the home to detect smoke, the presence of carbon monoxide, and/or chemical waste, soil and/or wood samples of the soil and/or trees surrounding the home to determine the condition of the foundation and/or the risk of a tree falling, etc.

In some embodiments, the UAVs may analyze the drone data assessing post-storm tree conditions, such as wood and soil samples, in real-time or at least near real-time using additional sensors and/or instruments to determine for example, soil moisture content, the age of a tree, the degree of root damage for a tree, etc. This is described in more detail below with reference to FIG. 6. In any event, the UAVs may transmit the drone data to central monitoring system 150 and/or one or more of external computing devices 160.1-160.M.

At block 506, the drone data may be analyzed to identify one or more risk elements by comparing the drone data to various risk parameters included in a risk element profile.

For example, risk elements may include a risk of fire, a flood risk, a natural disaster risk, a risk of fraud, a financial risk, a security risk, a risk based upon the condition of the asset, such as a weak foundation, a risk of a tree falling, a risk based upon the physical characteristics of the insured or potentially insured asset, a risk from hazardous objects, etc. In one aspect, each risk element may correspond to a risk element profile which may include various parameters that are combined and/or weighted to identify whether the asset is associated with the risk element.

For each identified risk element, the external computing device may determine an amount of risk associated with the risk element (block 508). In some embodiments, the amount of risk for each risk element may be a numeric score, for example from one to a hundred, may be a likelihood, may be a percentage, may be a category from a set of categories such as "High," Medium," "Low," and/or may be represented in any other suitable manner. The amount of risk for each risk element associated with the asset may be combined, aggregated, weighted, and/or scaled to determine a total amount of risk.

The method 500 may also include marrying the drone data to other sources of data (block 509). For instance, a processor may marry up the drone data to other data sources (insurance application, USGS seismic hazard maps, NOAA hurricane landfall hazard maps, tax assessors records of the year built, claims history, owners credit score, etc.) in order to develop a true risk potential for a particular insured asset that will realistically lead to the proper price for the risk.

For instance, in addition to combining amounts of risk for the risk elements, the external computing device may also retrieve data related to the insured or potentially insured asset from other remote servers, computing devices, and/or third parties to determine the total amount of risk. For example, the external computing device may retrieve a credit score for the owner of the insured or potentially insured asset from a credit reporting agency, a loss history report of previous insurance claims filed by the owner from a loss history reporting agency, tax assessor records indicative of the year in which the insured or potentially insured asset was built, or hazard maps indicative of hurricane landfalls, seismic activity, tornado touchdowns, etc., from the National Oceanic and Atmospheric Administration (NOAA). This data may be analyzed to determine additional amounts of risk which may be combined with the amounts of risk for the risk elements to determine the total amount of risk. For example, the credit score may be used to determine a financial risk and hazard maps may be used to determine a natural disaster risk which may be combined with risk elements identified by the drone data to determine the total amount of risk.

At block 510, insurance policy data may be generated for an insurance policy corresponding to the insured or potentially insured asset based upon the associated total amount of risk. For example, if the asset is not covered by an insurance policy, an insurance premium may be generated for a new insurance policy based upon the associated total amount of risk. If the asset is covered by an insurance policy, but the insurance policy is up for renewal or for example, a new addition has been added to the asset, the insurance premium may be adjusted based upon the associated total amount of risk.

For example, if a garage has been added to a home the insurance premium may be adjusted based upon the increased level security provided by the garage and based upon the increased size of the home due to the new addition of the garage. Moreover, if the foundation cracked after the initial underwriting was performed, the insurance premium may be adjusted based upon the size of the crack. For example, small cracks below a first predetermined threshold size may not increase the risk of structural damage and as a result, the insurance premium may remain the same. On the other hand, very large cracks above a second predetermined threshold size may be indicative of serious underlying issues such as sink holes or proximity to an unstable slope and may lead to cancellation or non-renewal of the insurance policy. In some embodiments, the generated/adjusted insurance premium may be transmitted to the policyholder's mobile computing device, such as the mobile computing device 300 as shown in FIG. 3.

In some embodiments, in addition to performing insurance underwriting and re-underwriting based upon the collected drone data, the external computing device may also perform risk mitigation and/or loss prevention. For example, upon receiving drone data indicative of smoke in a home having a temperature above 100 degrees, the external computing device may transmit an alert to emergency personnel such as a fire department upon detecting that a fire is imminent or the likelihood of a fire is above a predetermined threshold.

In some embodiments, upon insuring an asset the insurance provider via the external computing device may periodically (e.g., at predetermined time intervals, such as every day, every week, every month, etc.) direct the UAVs to monitor the insured asset and capture drone data at the insured asset. In this manner, the insurance provider may identify situations where the amount of risk to the insured asset has increased and/or take action to mitigate the risk or prevent loss. For example, the UAVs may collect drone data at the insured asset periodically to for example, identify that a tree is about to or is likely to fall on the insured asset. As a result, the insurance provider may transmit an alert to the policyholder and/or to emergency personnel to remove the tree.

Additionally, the insurance provider may refuse to renew the insurance policy or increase the insurance premiums unless the policyholder complies with additional requirements. For example, if an analysis of the soil indicates the presence of termites or other pests, the insurance provider may require the policyholder to contact pest control before renewing the insurance policy and/or as part of the renewal process. In another example, if the home has a high risk of sewer and/or drain backup (e.g., as detected by the soil moisture content in a soil sample exceeding a predetermined threshold moisture content level) the policyholder may be required to install a sump pump above a predetermined threshold size, type, capacity, or redundancy (e.g., electrical backup) before renewing the insurance policy and/or as part of the renewal process. Additionally, the insurance premium for the insurance policy may be increased when the insurance policy is renewed based upon the backup of sewer and drain risk. In yet another example, if an elevated porch or deck is installed in the home without proper guardrails, the policyholder may be required to install the proper guardrails before renewing the insurance policy. The method may include additional, fewer, or alternate actions, including those discussed elsewhere herein.

VI. Exemplary Method for Collecting Drone Data

Figure 6:
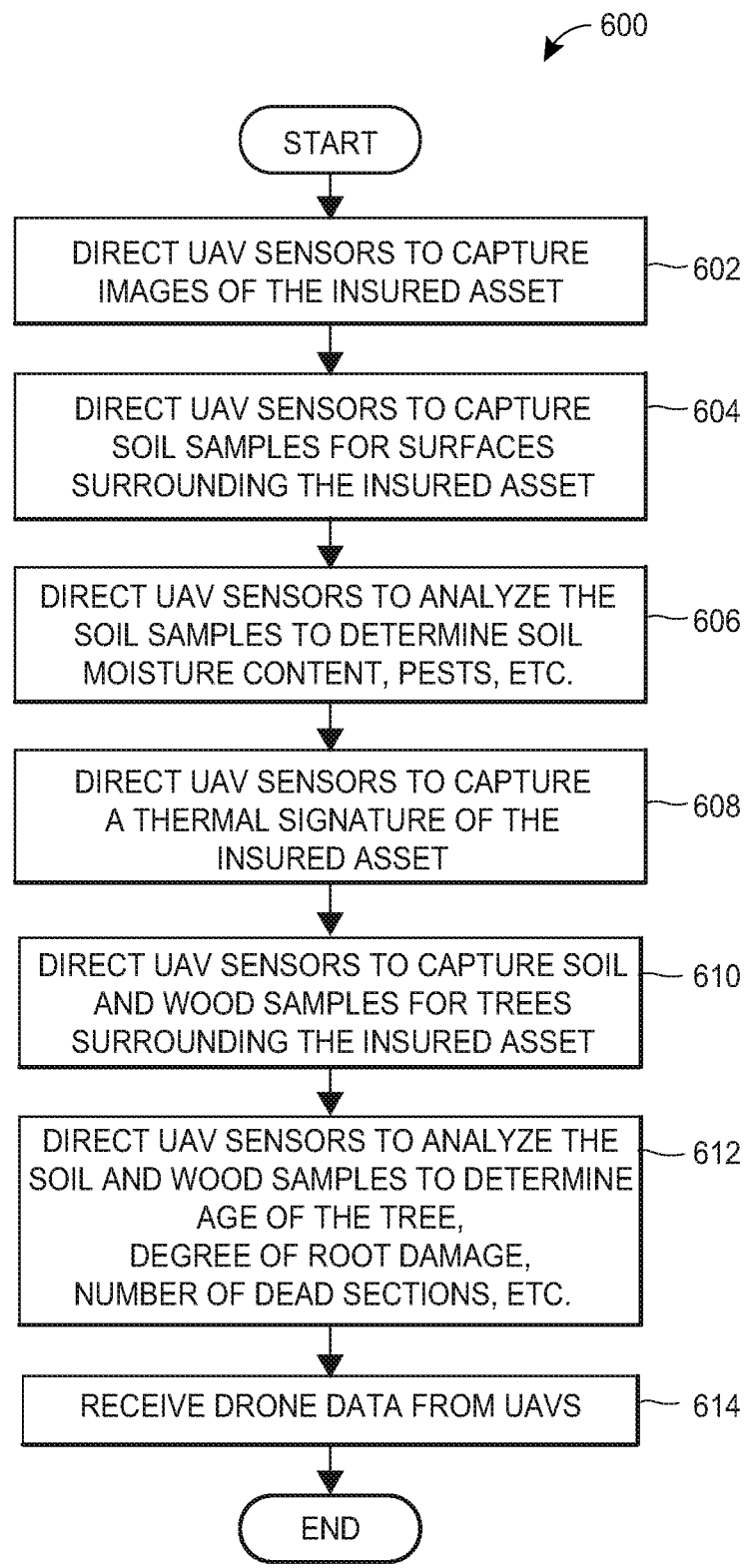
FIG. 6 illustrates an exemplary computer-implemented method 600 for collecting drone data from a UAV in accordance with an exemplary aspect of the present disclosure.

FIG. 6 illustrates an exemplary computer-implemented method 600 for collecting drone data. In the present aspect, method 600 may be implemented by any suitable computing device (e.g., central monitoring system 150 and/or one or more of external computing devices 160.1-160.M, as shown in FIG. 1). In the present aspect, method 600 may be performed by one or more processors, applications, and/or routines, such as processor 402 executing instructions in one or more module stored in memory 408, for example, as shown in FIG. 4.

In some embodiments, method 600 may be a more detailed version of block 504 of the method 500 as shown in FIG. 5. In any event, at block 602 one or more UAVs may be directed to capture images of the insured or potentially insured asset. The images may be from several viewing angles such as a front view, a back view, an aerial view, a side view, etc., of the insured or potentially insured asset. Moreover, the images may be captured from image sensors in both the visible and the non-visible spectrum, such as digital and thermal imaging sensors. The images may be transmitted as drone data to the external computing device in real-time or at least near real-time for determining risk elements and/or an amount of risk associated with each risk element as in blocks 506 and 508 of FIG. 5.

At block 604, the UAVs may be directed to capture soil samples from an area and/or surface surrounding the insured or potentially insured asset, such as the foundation of a home. The soil samples may be captured from a soil sample extractor coupled to the UAV and/or any other suitable sensor/instrument for extracting soil. The UAVs may then be directed to analyze the soil samples in real-time or at least near-real time to determine the soil content, the presence of pests, etc. (block 606).

For example, the soil samples may be analyzed using volumetric water content sensors, specialized biometric sensors, soil-testing equipment, or any other suitable sensor/instrument for analyzing the soil sample. The analyzed soil samples may be transmitted as drone data to the external computing device for determining risk elements and/or an amount of risk associated with each risk element as in blocks 506 and 508 of FIG. 5. For example, the analyzed soil samples may be used to identify a backup of sewer or drain risk if the soil moisture content exceeds a predetermined threshold level. In another example, the analyzed soil samples may be used to identify a risk of structural damage to the foundation of a home if the home is on expansive or evaporate type soils.

At block 608, the UAVs may be directed to capture a thermal signature of the insured or potentially insured asset. In some embodiments, the thermal signature may include an average temperature, a maximum temperature, average temperatures in various rooms of a home, etc. The thermal signature may be captured from thermal imaging sensors, thermistors, and/or any other suitable sensor/instrument for determining temperature. The thermal signature may also be transmitted as drone data to the external computing device in real time or at least near real-time for determining risk elements and/or an amount of risk associated with each risk element as in blocks 506 and 508 of FIG. 5. For example, the thermal signature may be used to identify a fire risk based upon very high temperatures and/or a risk of frozen pipes based upon very low temperatures. In another example, the thermal signature may be used to identify a risk of injury to occupants within the insured or potentially insured asset from heat exhaustion, heat stroke, and/or other injuries or illnesses from extreme temperatures and/or conditions. Moreover, the thermal signatures may be used to mitigate risk and/or prevent loss by transmitting an alert to emergency personnel regarding the risk of fire or risk of injury to occupants within the insured or potentially insured asset. An alert also may be transmitted to the policyholder to adjust the temperature, for example when there is a risk of frozen pipes.

At block 610, the UAVs may be directed to capture soil and wood samples for trees surrounding the insured or potentially insured asset. The soil and wood sample may be captured from a soil sample extractor, a wood sample extractor, etc. The UAVs may then be directed to analyze the soil and wood samples in real time or at least near real-time to determine the age of the trees, the degree of root damage for the trees, the number of dead sections of the trees, the degree of pest/insect damage to the trees (e.g., from pine bark beetles, emerald ash borers, etc.), the degree of fire damage to the trees, the general health of the trees (e.g., for issues caused by drought stress), etc. (block 612). For example, the soil and wood samples may be analyzed using volumetric water content sensors, specialized biometric sensors, soil-testing equipment, wood-testing equipment or any other suitable sensor/instrument for analyzing the soil and wood samples.

The analyzed soil and wood samples may be transmitted as drone data to the external computing device for determining risk elements and/or an amount of risk associated with each risk element as in blocks 506 and 508 of FIG. 5. For example, the analyzed soil and wood samples may be used to identify a risk of a tree falling on a home based upon the degree of root damage, number of dead sections, age of the tree, etc. Furthermore, the analyzed soil and wood samples may be used to mitigate risk and/or prevent loss by transmitting a request to the policyholder to remove dead sections such as dead branches or remove the entire tree. The method may include additional, fewer, or alternate actions, including those discussed elsewhere herein.

VII. Additional Technical Advantages

In the various aspects described herein, UAV 200, mobile computing device 300, and/or external computing device 400 may facilitate dispatching one or more UAVs to an area surrounding an insured or potentially insured asset, receiving collected drone data, determining a total amount of risk associated with the insured or potentially insured asset, and/or generating/adjusting an insurance premium for an insurance policy based upon the total amount of risk. Additionally or alternatively, these aspects may provide other benefits relating to the technical operation of UAV 200, mobile computing device 300, external computing device 400, and/or the storage devices associated therewith.

For example, by dispatching UAVs to collect drone data for an insured or potentially insured asset, the present aspect advantageously may perform underwriting or re-underwriting in a safe, accurate, and efficient manner.

More specifically, the UAVs may collect and analyze soil and wood samples, for example, in real-time or at least near-real time using various sensors/instruments as described above to determine soil moisture content, the presence of pests, the age, number of dead sections, and degree of root damage for trees, etc., which may be used to assess risk for the insured or potentially insured property. By contrast, traditionally soil and wood samples are transmitted to a laboratory for analysis which may take several days to complete. Therefore, by utilizing sensors/instruments coupled to the UAVs the underwriting process may be performed in an efficient manner.

Also, by collecting drone data in real-time or at least near real-time policyholders may be alerted of potential dangers to mitigate risk and/or potential harm. For example, the UAVs may collect thermal signatures and chemical data, and if the temperature of a home or the amount of smoke is such that it appears a fire may be imminent, emergency personnel such as a fire department may also be alerted.

Furthermore, in traditional underwriting processes, an insurance representative would ordinarily need to investigate the insured or potentially insured asset. For example, in order to investigate the risk and exposures of a home owner's roof, an insurance representative may have to climb onto the roof, and perform inspections while on the owner's roof. By climbing on the roof and attempting to maneuver around the roof to perform his inspection, the insurance representative opens himself to a real risk of injury, especially in difficult weather conditions where the roof may be slippery because of rain, snow, and/or ice and winds may be severe. By collecting data via UAVs, the present aspects advantageously may decrease the risk of injury to an insurance representative.

Moreover, the UAVs may allow for an accurate risk assessment of the insured or potentially insured asset which an insurance representative may not be able to perform. For example, UAVs may collect data from several locations/angles, such as an aerial view which an insurance representative cannot reach. Additionally, UAVs may collect data from the non-visible spectrum, which an insurance representative cannot retrieve without specialized equipment. For example, UAVs may gather tree heights and locations of trees relative to the insured asset using LiDAR and/or may collect data on the health of leaves using multispectral analysis. Thus, the present aspects advantageously may increase the accuracy of the underwriting process.

VIII. Insurance Underwriting and Re-Underwriting

A. Property and Infrastructure Assessment

In one aspect, UAV 200 may be deployed by an insurance provider to collect drone data, such as images, for example, of a property that is already insured or may be insured once an underwriting procedure has been performed. For example, if a homeowner wishes to open a homeowner's insurance policy on her home (or modify an existing one) an insurance provider traditionally needs to acquire information from the homeowner and/or from an insurance representative sent to the home to determine an appropriate risk assessment. Based upon the risk assessment, an insurance provider may then set the policy premiums, exceptions, riders, etc., accordingly. Some drone data that may be collected by UAV 200 and used for these types of insurance provider risk assessment analyses may include, for example, images of the roof of a home to determine its age and/or condition, proximity of the home to water sources to assess flood risks, number of fire escapes and/or fire exits, whether the home has recently added additions that need to be additionally insured, whether the home has a pool that could represent a higher risk of a person drowning (e.g., if there is no fence surrounding the pool) proximity of the home to fire hydrants, whether the home is close to land that may present a risk of sinkholes, avalanches, and/or mudslides, etc.

An insurance provider may tailor a risk assessment based upon a geographic area, whether the area is prone to certain types of natural disasters, whether the land surrounding a home is associated with a high risk of fire, etc. For example, if images of a home reveal a large amount of vegetation or overgrowth that could cause a fire risk, an insurance provider may use this information in the underwriting process to determine a fire risk profile. The insurance may then determine insurance policy data, such as an initial homeowner's insurance premium quote, exceptions, riders, etc., based upon this fire risk profile.

Since an insurance provider may issue policies for both commercial and residential customers, UAV 200 may collect drone data to be used for both of these types of policies. For example, in addition to homeowner's insurance policies, an insurance provider may utilize UAV 200 to collect drone data regarding commercial buildings and/or properties. In the case of a commercial building, UAV 200 may be deployed to investigate the inside of commercial buildings, such as warehouses, for example, to determine (or to allow the insurance provider to determine) whether certain aspects of the building has complied with building codes, fire codes, etc. As will be appreciated by those of ordinary skill in the relevant art(s), the insurance provider may schedule a convenient time for an inspection with the policyholder to dispatch UAV 200, thereby providing UAV 200 with entry to the building during this scheduled time window. By using the information collected from UAV 200 during the inspection, an insurance provider may appropriately assess the risk of insuring a commercial property.

The drone data collected by UAV 200 may encompass any suitably sized area, such as an area defined by a geofence, a radius from a specific location, etc. For example, when UAV 200 is deployed to collect drone data for a house, UAV 200 may receive instructions regarding the latitude and longitude geofence boundary associated with that home's property lines. To provide another example, UAV 200 may collect drone data over an area larger than a single property, such as portions of a large metropolitan area. Wider areas of drone data collected by UAV 200 may be used, for example, by insurance providers and/or municipalities to assess the condition of infrastructures such as roads, subways, trains, sewers, aqueducts, drainage systems, bridges, sidewalks, power grids, pipelines, rail lines, storage depots/facilities, etc. As previously discussed, municipalities and/or insurance providers may use drone data collected from UAV 200 to assess damage in the event of a catastrophe.

B. Risk Mitigation and Loss Prevention

Once an insurance policy has been issued, UAV 200 may be deployed by an insurance provider to collect information, such as images, for example, of insured properties to mitigate the insurance provider's risk and/or to prevent a loss that would be paid by the insurance provider. UAV 200 may be deployed by an insurance provider in this manner periodically to monitor insured properties, to detect higher levels of risk, and/or to detect an immediate threat of impending loss. For example, UAV 200 may determine whether thermal signatures for an insured home exceed a threshold temperature, thereby predicting that a fire has occurred within the house or soon will. To provide another example, UAV 200 may collect images that reveal whether a home has an outdoor barbeque grill or wood burning stove or other device that could present a risk of fire, whether a garage is present to reduce the risk of theft to an insured car on the property, etc.

Additionally or alternatively, UAV 200 may periodically perform tests in an area surrounding, or proximate to, an insured property. These tests could include soil samples and/or core samples that determine the presence of pests (e.g., termites) whether tree roots are decaying at a rate that poses a risk of the tree falling onto the insured property, soil moisture content, dangerous chemicals in the water supply, etc.

IX. Exemplary Underwriting

In one aspect, a computer-implemented method of underwriting insurance based upon drone data may be provided. The method may include (1) receiving image, audio, and/or other drone data, at or via a remote server (and/or one or more remote processors) associated with an insurance provider, from one or more drones (or drone transceivers) via wireless communication or data transmission, the drone data recording, showing, capturing, detailing, or otherwise being associated with real property, homes, vehicles, flood plains, rivers, streams, geographic features, trees, vegetation, foliage, fire hydrants, yards, and/or other conditions at various dates (i.e., over a period of time); (2) analyzing, at or via the remote server, the drone data received to determine a risk, or lack thereof, assessment for an insured asset, such as an insured property, home, vehicle, or other item, caused by conditions that have changed and/or are changing over time, the insured asset being covered by an insurance policy issued by the insurance provider; and/or (3) generating, updating, or adjusting, at or via the remote server, a premium, rate, reward, or discount for the insurance policy covering the insured asset based upon the risk, or lack thereof, assessment determined from the drone data showing the conditions that have changed and/or are changing over time. The method may include additional, fewer, or alternate actions, including those discussed elsewhere herein.

For example, the risk to the insured asset may be determined from analysis of infrared or thermal imaging drone data. The risk to the insured asset may be associated with pests or lack of pest control. The risk to the insured asset may be associated with vermin, animals, or rodents, and/or lack of vermin, animal, or rodent control. The risk to the insured asset may be determined from analysis of the drone date that reveals excessive soil saturation or moisture in the vicinity of the insured asset. The risk to the insured asset may be determined from a condition, or estimated age of, a roof or a number of exits from a building. The risk to the insured asset may be determined from a distance of a fire hydrant to an insured home, or a new addition to the insured home, such as a new garage or pool. The risk to the insured asset may be determined from an analysis of the drone data revealing an amount of time that an insured vehicle is typically parked in a garage, in a driveway, or on the street. The analysis of the drone data reveals that one or more trees in the vicinity of an insured home are diseased or dying, or need to have their branches trimmed.

X. Exemplary Method of Underwriting Insurance Based Upon Drone Data

In another aspect, a computer-implemented method of underwriting insurance based upon drone data may be provided. The method may include (1) receiving (via one or more processors, and/or wired or wireless communication and/or data transmission) drone data captured by one or more sensors communicatively coupled to one or more unmanned aerial vehicles, wherein the drone data corresponds to an asset insured or potentially insured by an insurance provider via an insurance policy; (2) analyzing (via the one or more processors) the drone data corresponding to the insured or potentially insured asset to identify one or more risk elements associated with the insured or potentially insured asset; (3) determining (via the one or more processors) an amount of risk associated with each of the one or more risk elements; and/or (4) generating (via the one or more processors) insurance policy data for the insurance policy corresponding to the insured or potentially insured asset based upon the amount of risk associated with each of the one or more risk elements to facilitate performing an accurate and efficient underwriting or re-underwriting process using data collected by the one or more unmanned aerial vehicles.

The method may further include directing (via one or more processors, and/or wired or wireless communication and/or data transmission) the one or more unmanned aerial vehicles to an area defined by a geofenced geographic location surrounding the insured or potentially insured asset; and/or directing (via one or more processors, and/or wired or wireless communication and/or data transmission) the one or more unmanned aerial vehicles to capture the drone data at a plurality of positions within the geofenced geographic location.

The drone data may further correspond to an area which surrounds the insured or potentially insured asset and the method may further include combining (via the one or more processors) a first amount of risk associated with each of the one or more risk elements corresponding to the insured or potentially insured asset with a second amount of risk associated with each of the one or more risk elements corresponding to the area which surrounds the insured or potentially insured asset; and/or determining (via the one or more processors) a total amount of risk associated with the insured or potentially insured asset based upon the combined amounts of risk.

The drone data may be current drone data and the act of analyzing the drone data to determine one or more risk elements may include obtaining (via the one or more processors) previous drone data corresponding to the insured or potentially insured asset and which was captured before the current drone data; and/or comparing (via the one or more processors) the previous drone data to the current drone data to determine whether the amount of risk associated with the insured or potentially insured asset has increased or decreased from a time in which the previous drone data was captured.

When the amount of risk associated with the insured or potentially insured asset has increased or decreased from the time in which the previous drone data was captured based upon the comparison, the method may further include adjusting (via the one or more processors) an insurance premium upon renewal of the insurance policy.

The insured or potentially insured asset may be a home, the drone data may include a thermal signature for the home, and when the thermal signature exceeds a predetermined threshold temperature based upon the analysis of the thermal signature, the method may include providing (via one or more processors, and/or wired or wireless communication and/or data transmission) an alert to emergency personnel that the home is at an increased risk of fire; and/or adjusting (via the one or more processors) an insurance premium upon renewal of the insurance policy based upon the increased risk of fire.

The insured or potentially insured asset may be a home, the drone data may include a soil sample of soil surrounding the home, and when soil moisture content exceeds a predetermined threshold moisture content level based upon the analysis of the soil sample, the method may include determining (via the one or more processors) a risk of sewer and/or drain backup associated with the home based upon the soil moisture content; adjusting (via the one or more processors); and/or determining (via the one or more processors) a sump pump above a predetermined threshold size, type, capacity, or redundancy recommended for the house to mitigate the sewer and/or drain backup risk based upon the soil moisture content.

The insured or potentially insured asset may be a home, the drone data may include a wood and a soil sample of a tree surrounding the home, and the method may include analyzing, by the one or more unmanned aerial vehicles, the wood and soil sample to determine a number and size of dead sections of the tree, a degree of root damage, a number of dead branches, or an age of the tree; receiving (via one or more processors, and/or wired or wireless communication and/or data transmission) the analysis of the wood and soil sample; and/or determining (via the one or more processors) a risk of the tree falling based upon the received analysis.

The drone data may include at least one of: (i) temperature data indicative of a current temperature associated with the insured or potentially insured asset; (ii) chemical and biological data; (ii) image data; (iii) audio data; (iv) location data; or (v) size data and material characteristics for the insured or potentially insured asset. The one or more risk elements may include at least one of: (i) a risk based upon a current condition of a component of the insured or potentially insured asset; (ii) a natural disaster risk associated with the insured or potentially insured asset; (iii) a risk of pests associated with the insured or potentially insured asset; (iv) a risk based upon a hazardous object or activity associated with the insured or potentially insured asset; or (v) a risk based upon a current condition of vegetation and/or other organic matter/debris at or around the insured or potentially insured asset. The method may include additional, fewer, or alternate actions, including those discussed elsewhere herein.

XI. Exemplary System for Underwriting Insurance Based Upon Drone Data

In yet another aspect, a system for underwriting insurance based upon drone data may be provided. The system may include one or more processors, a communication network, and/or a non-transitory, tangible computer-readable memory coupled to the one or more processors and the communication network and storing machine readable instructions, that when executed by the one or more processors, may cause the system to perform various tasks. For example, the instructions may cause the system to: (1) receive, via the communication network, drone data captured by one or more sensors communicatively coupled to one or more unmanned aerial vehicles, wherein the drone data corresponds to an asset insured or potentially insured by an insurance provider via an insurance policy; (2) analyze the drone data corresponding to the insured or potentially insured asset to determine one or more risk elements associated with the insured or potentially insured asset; (3) determine an amount of risk associated with each of the one or more risk elements; and/or (4) generate insurance policy data for the insurance policy corresponding to the insured or potentially insured asset based upon the amount of risk associated with each of the one or more risk elements to facilitate performing an accurate and efficient underwriting or re-underwriting process using data collected by the one or more unmanned aerial vehicles. The system may include additional, fewer, or alternate components and/or functionality, including that discussed elsewhere herein.

For instance, the instructions may further cause the system to direct, via the communication network, the one or more unmanned aerial vehicles to an area defined by a geofenced geographic location surrounding the insured or potentially insured asset; and/or direct, via the communication network, the one or more unmanned aerial vehicles to capture the drone data at a plurality of positions within the geofenced geographic location.

The drone data may further correspond to an area which surrounds the insured or potentially insured asset, and the instructions may further cause the system to: combine a first amount of risk associated with each of the one or more risk elements corresponding to the insured or potentially insured asset with a second amount of risk associated with each of the one or more risk elements corresponding to the area which surrounds the insured or potentially insured asset; and/or determine a total amount of risk associated with the insured or potentially insured asset based upon the combined amounts of risk.

The drone data may be current drone data and to analyze the drone data to determine one or more risk elements, the instructions may cause the system to: obtain previous drone data corresponding to the insured or potentially insured asset and which was captured before the current drone data; and/or compare the previous drone data to the current drone data to determine whether the amount of risk associated with the insured or potentially insured asset has increased or decreased from a time in which the previous drone data was captured.

When the amount of risk associated with the insured or potentially insured asset has increased or decreased from the time in which the previous drone data was captured based upon the comparison, the instructions may cause the system to adjust an insurance premium upon renewal of the insurance policy.

The insured or potentially insured asset may be a home, the drone data may include a thermal signature for the home, and when the thermal signature exceeds a predetermined threshold temperature based upon the analysis of the thermal signature, the instructions may further cause the system to: provide, via the communication network, an alert to emergency personnel that the home is at an increased risk of fire; and/or adjust an insurance premium upon renewal of the insurance policy based upon the increased risk of fire.

The insured or potentially insured asset may be a home, the drone data may include a soil sample of soil surrounding the home, and when soil moisture content exceeds a predetermined threshold moisture content level based upon the analysis of the soil sample, the instructions may further cause the system to: determine a risk of sewer and/or drain backup associated with the home based upon the soil moisture content; adjust an insurance premium upon renewal of the insurance policy based upon the risk of sewer and/or brain backup; and/or determine a sump pump above a predetermined threshold size, type, capacity, or redundancy recommended for the house to mitigate the sewer and/or drain backup risk based upon the soil moisture content.

The insured or potentially insured asset may be a home, the drone data may include a wood and a soil sample of a tree surrounding the home and the instructions may further cause the system to: receive, via the communication network, an analysis of the wood and soil sample by the one or more unmanned aerial vehicles, wherein the analysis includes a number and size of dead sections of the tree, a degree of root damage, a number of dead branches, or an age of the tree; and/or determine a risk of the tree falling based upon the received analysis.

The one or more sensors may include at least one of: (i) a heat sensor, (ii) an image sensor, (iii) an ultrasonic sensor, (iv) a biometric sensor, (v) a water content sensor, (vi) a mass spectrometer, (vii) a positioning sensor, (viii) a light detection and ranging (LiDAR) sensor, (ix) a multispectral sensor, or (x) an audio sensor. The one or more risk elements may include at least one of: (i) a risk based upon a current condition of a component of the insured or potentially insured asset; (ii) a natural disaster risk associated with the insured or potentially insured asset; (iii) a risk of pests associated with the insured or potentially insured asset; (iv) a risk based upon a hazardous object or activity associated with the insured or potentially insured asset; or (v) a risk based upon a current condition of vegetation and/or other organic matter/debris at or around the insured or potentially insured asset.

XII. Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. The patent claims at the end of this patent application are not intended to be construed under 35 U.S.C. § 112(f) unless traditional means-plus-function language is expressly recited, such as "means for" or "step for" language being explicitly recited in the claim(s).

Accordingly, the term "insurance provider" as used herein, generally refers to a party and/or entity (e.g., a business and/or other organizational entity) that provides insurance products, e.g., by offering and/or issuing insurance policies. Typically, but not necessarily an insurance provider may be an insurance company. Further, an insurance provider may be any individual, group of individuals, company, corporation, and/or other type of entity that may issue insurance policies for customers, such as insurance policies associated with properties.

As used herein, the term "insured asset" may be used to refer to any asset, such as a vehicle, home, boat, real property and/or other property, which is insured by an insurance provider. "Insured asset" may include property which requires re-underwriting, because for example the insurance on the property is up for renewal or circumstances have changed in such a manner that the insurance provider requires re-underwriting. The term "potentially insured asset" may be used to refer to any asset, such as a vehicle, home, boat, real property and/or other property, which the owner would like to have insured by the insurance provider, but which must go through the underwriting process first before an appropriate premium can be determined and the property can be insured.

Additionally, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

Although the embodiments discussed herein mainly focus on homeowners' insurance policies, it should be appreciated that an insurance provider may offer or provide one or more different types of insurance policies. Other types of insurance policies may include, for example, vehicle insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," and "customer," are used interchangeably herein to refer to a person, party, or entity (e.g., a business or other organizational entity) that is covered by the insurance policy, e.g., whose insured article or entity (e.g., property, life, health, auto, home, business) is covered by the policy. Generally, the term "user" is used when referring to a person who is operating a client device and is not exclusive of the terms "customer," "passenger," "insured," "insured party," and "policyholder."

The term "real-time" as used herein, may be used to refer to information delivered and/or analyzed within a predetermined amount of time after it is collected (e.g., seconds, minutes, hours, etc.). For example, images, audio, video, thermal signatures, soil and wood samples, etc., which are analyzed to assess risk to an insured or potentially insured asset within a short period of time after they are collected may be referred to herein as a "real-time." The term "near real-time" as used herein, may be used to refer to information delivered and/or analyzed within a predetermined amount of time after real-time. For example, drone data may be transmitted in "near real-time" when there is a processing delay between the time the drone data is recorded and the time the drone data is transmitted (e.g., one minute, five minutes, twenty minutes, an hour, etc.).

UAVs are described throughout the disclosure as being dispatched, deployed, or otherwise instructed to travel to one or more locations to perform various functions. As will be appreciated by those of ordinary skill in the relevant art(s), UAVs may be instructed to navigate to a specific location via any suitable techniques, such as referencing a postal address, a landmark, a location received in terms of latitude and longitude coordinates, etc. When a UAV is instructed to navigate to a geographic location and/or to perform various functions associated with a geographic location, the geographic location may be defined in any suitable manner, such as a geofenced coordinate boundary, for example. Regardless of the specific purpose of the information collected by a UAV as further provided below, a UAV may receive instructions, collect information, execute various actions, store information, and/or transmit collected information in any suitable manner.

Furthermore, throughout the disclosure, functions to be performed by one or more UAVs may be explained as being performed by a single UAV, such as UAV 200, for example, for purposes of brevity. In the aspects described herein, any described aspects may be performed by a single UAV or any suitable number of additional UAVs.

In some aspects, the various UAV functions may be performed by UAVs maneuvering with or without a tethered system. For example, in some aspects, one or more UAVs may fly untethered to carryout various functions. In other aspects, however, one or more UAVs may utilize a tethering system while flying (or other means of locomotion) within a radius governed by the length of the tether. Such tethering systems may be particularly useful, for example, when higher power requirements are required, such that one or more UAVs may receive power via the tether instead of draining their respective internal batteries. UAV 200 may include additional, fewer, or alternate actions, including those discussed elsewhere herein.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or temporarily configured circuitry (e.g., configured by software) may be driven by cost/time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Upon reading this disclosure, those of skill in the art will appreciate still additional alternative structural and functional designs for executing actions with one or more UAVs, collecting information via one or more UAVs, and/or and utilizing this collected information through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

With the foregoing, an insurance customer may opt into a rewards, insurance discount, or other type of program. After the insurance customer provides their affirmative consent, an insurance provider drone or UAV may collect image data of insured assets before (and/or after) an insurance-related event, including those events discussed elsewhere herein. Risks, and/or lack thereof, may be identified from computer analysis of the drone data. Recommendations to mitigate risk may be generated and transmitted to insurance customers to allow them to take corrective action. In return, risk averse drivers, and/or vehicle or home owners may receive discounts or insurance cost savings related to auto, home, and other types of insurance from the insurance provider.

In one aspect, drone or UAV data, and/or other data, including the types of data discussed elsewhere herein, may be collected or received by an insurance provider remote server, such as via direct or indirect wireless communication or data transmission from a drone or UAV, after a customer affirmatively consents or otherwise opts into an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles or homes, and/or (ii) vehicle operators or passengers, or home occupants.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method of directing an unmanned aerial vehicle for inspecting a property, the method comprising:

receiving, by one or more processors, a location for an inspection of a property to be conducted by an unmanned aerial vehicle (UAV);

determining, by the one or more processors, a geofence boundary based on an area corresponding to a property boundary;

determining, by the one or more processors, a navigation route corresponding to the geofence boundary for inspection of the property by the UAV;

sending control signals, by the one or more processors to the UAV, to direct the UAV to capture drone data along the navigation route.

2. The computer-implemented method of claim 1, further comprising:
receiving, at the one or more processors, the drone data captured by one or more sensors communicatively coupled to the UAV, wherein the drone data corresponds to the property.

3. The computer-implemented method of claim 2, further comprising:
analyzing, by the one or more processors, the drone data corresponding to the property to identify one or more risk elements associated with the property; and
determining, by the one or more processors, an amount of risk associated with each of the one or more risk elements.

4. The computer-implemented method of claim 3, wherein the drone data further corresponds to an area which surrounds the property, and further comprising:
combining, by the one or more processors, a first amount of risk associated with each of the one or more risk elements corresponding to the property with a second amount of risk associated with each of the one or more risk elements corresponding to the area which surrounds the property; and
determining, by the one or more processors, a total amount of risk associated with the property based upon the combined amounts of risk.

5. The computer-implemented method of claim 3, wherein the drone data is current drone data and analyzing the drone data to determine one or more risk elements includes:
obtaining, at the one or more processors, previous drone data corresponding to the property and which was captured before the current drone data; and
comparing, by the one or more processors, the previous drone data to the current drone data to determine whether the amount of risk associated with the property has increased or decreased from a time in which the previous drone data was captured.

6. The computer-implemented method of claim 2, wherein the property is a home, the drone data includes a thermal signature for the home, and when the thermal signature exceeds a predetermined threshold temperature based upon an analysis of the thermal signature, the method further comprises:
providing, by the one or more processors, an alert to emergency personnel that the home is at an increased risk of fire.

7. The computer-implemented method of claim 2, wherein the property is a home, the drone data includes a soil sample of soil surrounding the home, and when soil moisture content exceeds a predetermined threshold moisture content level based upon an analysis of the soil sample, the method further comprises:
determining, by the one or more processors, a risk of sewer or drain backup associated with the home based upon the soil moisture content; and
identifying, by the one or more processors, a sump pump above a predetermined threshold size, type, capacity, or redundancy recommended for the house to mitigate the risk of sewer or drain backup based upon the soil moisture content.

8. The computer-implemented method of claim 2, wherein the property is a home, the drone data includes a wood and a soil sample of a tree surrounding the home and the method further comprises:
analyzing, by the UAV, the wood and soil sample to determine a number and size of dead sections of the tree, a degree of root damage, a number of dead branches, or an age of the tree;
receiving, at the one or more processors, the analysis of the wood and soil sample; and
determining, by the one or more processors, a risk of the tree falling based upon the received analysis.

9. The computer-implemented method of claim 1, wherein the drone data includes at least one of: (i) temperature data indicative of a current temperature associated with the property; (ii) chemical and biological data; (ii) image data; (iii) audio data; (iv) location data; or (v) size data and material characteristics for the property.

10. The computer-implemented method of claim 3, wherein the one or more risk elements include at least one of: (i) a risk based upon a current condition of a component of the property; (ii) a natural disaster risk associated with the property; (iii) a risk of pests associated with the property; (iv) a risk based upon a hazardous object or activity associated with the property; or (v) a risk based upon a current condition of vegetation or other organic matter at or around the property.

11. A system of directing an unmanned aerial vehicle for inspecting a property, the system comprising:
one or more processors;
a communication network;
a non-transitory computer-readable memory coupled to the one or more processors, and the communication network, and storing thereon instructions that, when executed by the one or more processors, cause the system to:
receive, via the communication network, a location for an inspection of a property to be conducted by an unmanned aerial vehicle (UAV);
determine a geofence boundary based on an area corresponding to a property boundary;
determine a navigation route corresponding to the geofence boundary for inspection of the property by the UAV; and
send control signals to the UAV to direct the UAV to capture drone data along the navigation route.

12. The system of claim 11, wherein the instructions further cause the system to:
receive, via the communication network, the drone data captured by one or more sensors communicatively coupled to the UAV at each waypoint on the navigating route, wherein the drone data corresponds to the property.

13. The system of claim 12, wherein the instructions further cause the system to:
analyze the drone data corresponding to the property to identify one or more risk elements associated with the property; and
determine an amount of risk associated with each of the one or more risk elements.

14. The system of claim 13, wherein the drone data further corresponds to an area which surrounds the property, and the instructions further cause the system to:
combine a first amount of risk associated with each of the one or more risk elements corresponding to the property with a second amount of risk associated with each of the one or more risk elements corresponding to the area which surrounds property; and
determine a total amount of risk associated with the property based upon the combined amounts of risk.

15. The system of claim 13, wherein the drone data is current drone data and to analyze the drone data to determine one or more risk elements, the instructions cause the system to:
obtain previous drone data corresponding to the property and which was captured before the current drone data; and
compare the previous drone data to the current drone data to determine whether the amount of risk associated with the property has increased or decreased from a time in which the previous drone data was captured.

16. The system of claim 12, wherein the property is a home, the drone data includes a thermal signature for the home, and when the thermal signature exceeds a predetermined threshold temperature based upon an analysis of the thermal signature, the instructions further cause the system to:
provide, via the communication network, an alert to emergency personnel that the home is at an increased risk of fire.

17. The system of claim 12, wherein the property is a home, the drone data includes a soil sample of soil surrounding the home, and when soil moisture content exceeds a predetermined threshold moisture content level based upon the analysis of the soil sample, the instructions further cause the system to:
determine a risk of sewer or drain backup associated with the home based upon the soil moisture content; and
determine a sump pump above a predetermined threshold size, type, capacity, or redundancy recommended for the house to mitigate the risk of sewer or drain backup based upon the soil moisture content.

18. The system of claim 12, wherein the property is a home, the drone data includes a wood and a soil sample of a tree surrounding the home and the instructions further cause the system to:
receive, via the communication network, an analysis of the wood and soil sample by the UAV, wherein the analysis includes a number and size of dead sections of the tree, a degree of root damage, a number of dead branches, or an age of the tree; and
determine a risk of the tree falling based upon the received analysis.

19. The system of claim 12, wherein the one or more sensors include at least one of: (i) a heat sensor, (ii) an image sensor, (iii) an ultrasonic sensor, (iv) a biometric sensor, (v) a water content sensor, (vi) a mass spectrometer, (vii) a positioning sensor, (viii) a light detection and ranging (LiDAR) sensor, (ix) a multispectral sensor, or (x) an audio sensor.

20. The system of claim 13, wherein the one or more risk elements include at least one of: (i) a risk based upon a current condition of a component of the property; (ii) a natural disaster risk associated the property; (iii) a risk of pests associated with the property; (iv) a risk based upon a hazardous object or activity associated with property; or (v) a risk based upon a current condition of vegetation or other organic matter at or around property.

* * * * *